(12) United States Patent
Shinozaki et al.

(10) Patent No.: US 10,623,804 B2
(45) Date of Patent: Apr. 14, 2020

(54) MOVING IMAGE CAPTURING INSTRUCTING TERMINAL, MOVING IMAGE CAPTURING SYSTEM, MOVING IMAGE CAPTURING INSTRUCTION METHOD, AND NON-TRANSITORY RECORDING MEDIUM STORING PROGRAM FOR DISPLAYING AT LEAST ONE OF RECORDING PERIOD OF TIME AND COMBINATION OF RECORDING START TIME AND RECORDING STOP TIME

(71) Applicant: OLYMPUS CORPORATION, Tokyo (JP)

(72) Inventors: Arata Shinozaki, Tokyo (JP); Kensuke Ishii, Tokyo (JP); Saori Matsumoto, Tokyo (JP); Kiiko Takamatsu, Tokyo (JP); Yoshitaka Sato, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 26 days.

(21) Appl. No.: 16/003,581

(22) Filed: Jun. 8, 2018

(65) Prior Publication Data
US 2018/0295410 A1    Oct. 11, 2018

Related U.S. Application Data

(63) Continuation of application No. PCT/JP2015/084443, filed on Dec. 8, 2015.

(51) Int. Cl.
*H04N 21/433* (2011.01)
*H04N 21/436* (2011.01)
(Continued)

(52) U.S. Cl.
CPC .......... *H04N 21/4334* (2013.01); *H04N 5/10* (2013.01); *H04N 5/232* (2013.01); *H04N 5/77* (2013.01);
(Continued)

(58) Field of Classification Search
CPC ...... H04N 21/4334; H04N 5/10; H04N 5/232; H04N 7/18; H04N 21/442; H04N 5/232939; H04N 5/445; H04N 5/23293
See application file for complete search history.

(56) References Cited

U.S. PATENT DOCUMENTS 7,859,571 B1 * 12/2010 Brown ............. G08B 13/19645
348/211.3

FOREIGN PATENT DOCUMENTS

| JP | 2001-189888 A | 7/2001 |
|----|---------------|--------|
| JP | 2005-268871 A | 9/2005 |
| JP | 2013-175819 A | 9/2013 |

OTHER PUBLICATIONS

International Search Report dated Mar. 15, 2016 issued in PCT/JP2015/084443.

* cited by examiner

*Primary Examiner* — Nicholas G Giles
(74) *Attorney, Agent, or Firm* — Scully, Scott, Murphy & Presser, P.C.

(57) ABSTRACT

A moving image capturing instructing terminal includes a communicator, a monitor, a memory, and a control unit. The control unit transmits recording start instruction information to a camera through the communicator. After the recording start instruction information is transmitted, the control unit receives moving image recording information related to the recording of the moving image from the camera through the communicator. After the recording start instruction information is transmitted, the control unit displays at least one of
(Continued)

a scheduled recording period of time and a combination of a scheduled recording start time and a scheduled recording stop time through the monitor. After the moving image recording information is received, the control unit displays at least one of a recording period of time and a combination of a recording start time and a recording stop time through the monitor.

21 Claims, 22 Drawing Sheets

(51) Int. Cl.
| | | |
|---|---|---|
| *H04N 5/77* | (2006.01) | |
| *H04N 21/4223* | (2011.01) | |
| *H04N 5/10* | (2006.01) | |
| *H04N 5/232* | (2006.01) | |
| *H04N 7/18* | (2006.01) | |
| *H04N 21/442* | (2011.01) | |

(52) U.S. Cl.
CPC .......... *H04N 7/18* (2013.01); *H04N 21/4223* (2013.01); *H04N 21/433* (2013.01); *H04N 21/436* (2013.01); *H04N 21/442* (2013.01)

MOVING IMAGE CAPTURING INSTRUCTING TERMINAL, MOVING IMAGE CAPTURING SYSTEM, MOVING IMAGE CAPTURING INSTRUCTION METHOD, AND NON-TRANSITORY RECORDING MEDIUM STORING PROGRAM FOR DISPLAYING AT LEAST ONE OF RECORDING PERIOD OF TIME AND COMBINATION OF RECORDING START TIME AND RECORDING STOP TIME

CROSS-REFERENCE TO RELATED APPLICATIONS

This application is a continuation under 35 U.S.C. § 365(c) of PCT International Application No. PCT/JP2015/084443, filed on Dec. 8, 2015. The content of PCT International Application No. PCT/JP2015/084443 is incorporated by reference herein.

BACKGROUND

Technical Field

The present invention relates to a moving image capturing instructing terminal, a moving image capturing system, a moving image capturing instruction method, and a computer-readable storage device storing a program.

Background Art

Cameras which have a wireless communicator function and are capable of capturing and recording moving images have been used. A moving image capturing instructing terminal can control a camera by performing wireless communication with the camera.

A technique of reducing a deviation of a photographing timing caused by a delay in wireless communication is disclosed in Patent Literature 1. In the technique disclosed in Patent Literature 1, a moving image captured by a camera is temporarily stored in a buffer. While the camera is capturing a moving image, the moving image captured by the camera is transmitted to a moving image capturing instructing terminal, and the moving image capturing instructing terminal displays the received moving image. When an instruction to start recording of a moving image is given by a user, the moving image capturing instructing terminal transmits information indicating an instruction to start the recording of the moving image to the camera. A time at which the instruction to start the recording of the moving image is given is included in the information. The camera reads a frame image corresponding to the time at which the instruction to start the recording of the moving image is given from the buffer and records the read frame image in a memory. When an instruction to stop the recording of the moving image is given by the user, the moving image capturing instructing terminal transmits information indicating an instruction to stop the recording of the moving image to the camera. A time at which an instruction to stop the recording of the moving image is given is included in the information. The camera reads a frame image corresponding to the time at which an instruction to stop the recording of the moving image is given from the buffer and records the read frame image in the memory. Thereafter, the camera stops the recording of the moving image. Therefore, the camera can record the moving image corresponding to the time at which the instruction to record the moving image is given by the user.

CITATION LIST

Patent Literature

Patent Literature 1: JP 2013-175819 A

SUMMARY

In the moving image capturing by the camera with the wireless communicator function, the moving image capturing may be stopped regardless of an instruction of the user. For example, the moving image capturing may be stopped due to an insufficient remaining capacity of the memory. Alternatively, the moving image capturing may be stopped due to an insufficient remaining capacity of a battery. Therefore, it is preferable that the user be able to check whether or not a moving image of a timing or a time intended by the user is recorded by the camera. In the technique disclosed in Patent Literature 1, in a case in which the moving image capturing is stopped regardless of the instruction of the user, the user is unable to check whether or not the moving image of the timing or the time intended by the user is recorded by the camera.

It is an object of the present invention to provide a moving image capturing instructing terminal, a moving image capturing system, a moving image capturing instruction method, and a program which are capable of notifying the user of information for checking a timing or a time at which the moving image is recorded.

According to a first aspect the present invention, a moving image capturing instructing terminal includes a communicator, a monitor, a memory, and control unit. The communicator performs wireless communication with a camera that captures and records a moving image. The memory stores a scheduled recording start time and a scheduled recording stop time. The control unit transmits recording start instruction information to the camera through the communicator. The recording start instruction information indicates an instruction to start the capturing and the recording of the moving image. After the recording start instruction information is transmitted, the control unit receives moving image recording information related to the recording of the moving image from the camera through the communicator. After the recording start instruction information is transmitted, the control unit displays at least one of a scheduled recording period of time and a combination of a scheduled recording start time and a scheduled recording stop time through the monitor. The scheduled recording period of time is based on the scheduled recording start time and the scheduled recording stop time. After the moving image recording information is received, the control unit displays at least one of a recording period of time and a combination of a recording start time and a recording stop time through the monitor. The recording period of time, the recording start time, and the recording stop time are based on the moving image recording information.

According to a second aspect of the present invention, in the first aspect, the moving image capturing instructing terminal may further include an input interface that receives an instruction from a user. When the input interface receives a recording start instruction from the user, the control unit may transmit the recording start instruction information to the camera through the communicator, and the memory may store the scheduled recording start time.

According to a third aspect of the present invention, in the second aspect, after the recording start instruction information is transmitted, when the input interface receives a recording stop instruction from the user, the control unit may transmit the recording stop instruction information to the camera by the communicator, the memory may store the scheduled recording stop time. The recording stop instruction information indicates an instruction to stop the capturing and the recording of the moving image.

According to a fourth aspect of the present invention, in the second aspect, the memory may further store the scheduled recording period of time. When the scheduled recording period of time elapses from after the input interface receives the recording start instruction from the user, the control unit may transmit recording stop instruction information to the camera through the communicator, and the memory may store the scheduled recording stop time. The recording stop instruction information indicates an instruction to stop the capturing and the recording of the moving image.

According to a fifth aspect of the present invention, in the first aspect, the memory may further store a program in which an operation of the control unit is specified. The control unit may transmit the recording start instruction information to the camera through the communicator in accordance with the program. When the control unit transmits the recording start instruction information to the camera through the communicator, the memory may store the scheduled recording start time. After the recording start instruction information is transmitted, the control unit may further transmit recording stop instruction information to the camera through the communicator in accordance with the program. The recording stop instruction information may indicate an instruction to stop the capturing and the recording of the moving image. When the control unit transmits the recording stop instruction information to the camera through the communicator, the memory may store the scheduled recording stop time.

According to a sixth aspect of the present invention, in the first aspect, the moving image recording information may include the recording period of time based on the recording start time and the recording stop time. After the moving image recording information is received, the control unit may display the recording period of time by the monitor.

According to a seventh aspect of the present invention, in the first aspect, the moving image recording information may include one of information including the recording start time which is received from the camera through the communicator and information which is transmitted by the camera at the recording start time and received through the communicator. The moving image recording information may include one of information including the recording stop time which is received from the camera through the communicator and information which is transmitted from the camera at the recording stop time and received through the communicator. After the moving image recording information is received, the control unit may perform one of a first process and a second process. In the first process, the control unit may calculate the recording period of time on the basis of the recording start time and the recording stop time and display the recording period of time through the monitor. In the second process, the control unit may display a combination of the recording start time and the recording stop time through the monitor.

According to an eighth aspect of the present invention, in the first aspect, after the moving image recording information is received, the control unit may further calculate a difference between the recording stop time and the scheduled recording stop time. The control unit may further calculate a second recording period of time on the basis of a difference with a first recording period of time based on the moving image recording information. The control unit may display the second recording period of time through the monitor.

According to a ninth aspect of the present invention, in the first aspect, after the moving image recording information is received, the control unit may further calculate the recording period of time on the basis of the recording start time and the scheduled recording stop time and display the recording period of time through the monitor.

According to a tenth aspect of the present invention, in the first aspect, the camera may be each of a plurality of cameras. After the moving image recording information is received from the plurality of cameras, the control unit may further calculate the recording period of time included in a period of time included between the scheduled recording start time and the scheduled recording stop time on the basis of the moving image recording information for each of the plurality of cameras. The control unit may display camera information of only the camera having the shortest recording period of time among the plurality of cameras through the monitor. The camera information includes at least one of the recording period of time and the combination of the recording start time and the recording stop time.

According to an eleventh aspect of the present invention, in the first aspect, the camera may be each of a plurality of cameras. After the moving image recording information is received from the plurality of cameras, the control unit may further calculate the recording period of time included in a period of time included between the scheduled recording start time and the scheduled recording stop time on the basis of the moving image recording information for each of the plurality of cameras. The control unit may display first information to be emphasized more than second information through the monitor. The first information is camera information of the camera having the shortest recording period of time among the plurality of cameras. The second information is camera information of the camera excluding the camera having the shortest recording period of time among the plurality of cameras. The camera information includes at least one of the recording period of time and the combination of the recording start time and the recording stop time.

According to a twelfth aspect of the present invention, in the first aspect, the camera may be each of a plurality of cameras. After the moving image recording information is received from the plurality of cameras, the control unit may further calculate the recording period of time included in a period of time included between the scheduled recording start time and the scheduled recording stop time on the basis of the moving image recording information for each of the plurality of cameras. The control unit may further transmit image transmission instruction information to the camera having the shortest recording period of time among the plurality of cameras through the communicator. The image transmission instruction information indicates an instruction to transmit at least one of a plurality of frame images constituting the moving image. The control unit may further receive one or more frame images from the camera which has received the image transmission instruction information through the communicator. The control unit may further display the received frame image through the monitor.

According to a thirteenth aspect of the present invention, in the first aspect, the camera may be each of a plurality of cameras. After the moving image recording information is received from the plurality of cameras, the control unit may further calculate the recording period of time included in a period of time included between the scheduled recording start time and the scheduled recording stop time on the basis of the moving image recording information for each of the plurality of cameras. The control unit may further transmit moving image reproduction instruction information to the camera having the shortest recording period of time among the plurality of cameras through the communicator. The moving image reproduction instruction information indicates a streaming reproduction instruction of the moving image. The control unit may further continuously receive each of a plurality of frame images constituting the moving image from the camera which has received the moving image reproduction instruction information through the communicator. The control unit may further continuously display the received frame images through the monitor.

According to a fourteenth aspect of the present invention, in the first aspect, the camera may be each of a plurality of cameras. After the moving image recording information is received from the plurality of cameras, the control unit may further calculate the recording period of time included in a period of time included between the scheduled recording start time and the scheduled recording stop time on the basis of the moving image recording information for each of the plurality of cameras. The control unit may further transmit moving image reproduction instruction information to the camera having the longest recording period of time among the plurality of cameras through the communicator. The moving image reproduction instruction information indicates a streaming reproduction instruction of the moving image. The control unit may further continuously receive each of a plurality of frame images constituting the moving image from the camera which has received the moving image reproduction instruction information through the communicator. The control unit may further continuously display the received frame images through the monitor. The control unit may further display an event related to the capturing and the recording of the moving image in synchronization with the display of the frame images through the monitor.

According to a fifteenth aspect of the present invention, in the first aspect, the camera may be each of a plurality of cameras. After the moving image recording information is received from the plurality of cameras, the control unit may further calculate a difference between the recording start time and the scheduled recording start time for each of the plurality of cameras. The control unit may display camera information of only the camera having the largest difference among the plurality of cameras through the monitor. The camera information includes at least one of the recording period of time and the combination of the recording start time and the recording stop time.

According to a sixteenth aspect of the present invention, in the first aspect, the camera may be each of a plurality of cameras. After the moving image recording information is received from the plurality of cameras, the control unit may further calculate a difference between the recording start time and the scheduled recording start time for each of the plurality of cameras. The control unit may display first information to be emphasized more than second information through the monitor. The first information is camera information of the camera having the largest difference among the plurality of cameras. The second information is camera information of the camera excluding the camera having the largest difference among the plurality of cameras. The camera information includes at least one of the recording period of time and the combination of the recording start time and the recording stop time.

According to a seventeenth aspect of the present invention, in the first aspect, the camera may be each of a plurality of cameras. After the moving image recording information is received from the plurality of cameras, the control unit may further calculate a difference between the recording start time and the scheduled recording start time for each of the plurality of cameras. The control unit may further transmit image transmission instruction information to the camera having the largest difference among the plurality of cameras through the communicator. The image transmission instruction information indicates an instruction to transmit at least one of a plurality of frames constituting the moving image. The control unit may further receive one or more frame images from the camera which has received the image transmission instruction information through the communicator. The control unit may further display the received frame image through the monitor.

According to an eighteenth aspect of the present invention, in the first aspect, the control unit may include one or more processors.

According to a nineteenth aspect of the present invention, a moving image capturing system includes a moving image capturing instructing terminal and a camera that captures and records a moving image. The moving image capturing instructing terminal includes a first communicator, a monitor, a first memory, and a first control unit. The first communicator performs wireless communication with the camera. The first memory stores a scheduled recording start time and a scheduled recording stop time. The first control unit transmits recording start instruction information to the camera through the first communicator. The recording start instruction information indicates an instruction to start the capturing and the recording of the moving image. After the recording start instruction information is transmitted, the first control unit receives moving image recording information related to the recording of the moving image from the camera through the first communicator. After the recording start instruction information is transmitted, the first control unit displays at least one of a scheduled recording period of time and a combination of the scheduled recording start time and the scheduled recording stop time through the monitor. The scheduled recording period of time is based on the scheduled recording start time and the scheduled recording stop time. After the moving image recording information is transmitted, the first control unit displays at least one of a recording period of time and a combination of the recording start time and the recording stop time through the monitor. The recording period of time, the recording start time, and the recording stop time are based on the moving image recording information. The camera includes a second communicator, an imaging element, a second memory, and a second control unit. The second communicator performs wireless communication with the moving image capturing instructing terminal. The second control unit receives the recording start instruction information from the moving image capturing instructing terminal through the second communicator. After the recording start instruction information is received, the second control unit starts the capturing of the moving image by the imaging element. After the capturing of the moving image is started, the second control unit stops the capturing of the moving image by the imaging element. Before the capturing of the moving image is stopped after the capturing of the moving image is started, the second control unit records the moving image in the second memory. After the capturing of the moving image is stopped, the second control unit transmits the moving image recording information to the moving image capturing instructing terminal by the second communicator.

According to a twentieth aspect of the present invention, a moving image capturing instruction method includes a first step, a second step, a third step, and a fourth step. The first step includes transmitting recording start instruction information to a camera by a communicator performing wireless communication with the camera. The recording start instruction information indicates an instruction to start capturing and recording of a moving image. The camera performs the capturing and the recording of the moving image. The second step includes receiving, after the recording start instruction information is transmitted, moving image recording information related to the recording of the moving image from the camera through the communicator. The third step includes displaying, after the recording start instruction information is transmitted, at least one of a scheduled recording period of time and a combination of a scheduled recording start time and a scheduled recording stop time through a monitor. The scheduled recording period of time is based on the scheduled recording start time and the scheduled recording stop time stored in a memory. The fourth step includes displaying, after the moving image recording information is received, at least one of a recording period of time and a combination of a recording start time and a recording stop time through the monitor. The recording period of time, the recording start time, and the recording stop time are based on the moving image recording information.

According to a twenty-first aspect of the present invention, a program is a program causing a computer of a moving image capturing instructing terminal to execute a first step, a second step, a third step, and a fourth step. The first step transmits recording start instruction information to a camera through a communicator that performs wireless communication with the camera. The recording start instruction information indicates an instruction to start the capturing and the recording of the moving image. The camera performs the capturing and the recording of the moving image. The second step includes receiving, after the recording start instruction information is transmitted, moving image recording information related to the recording of the moving image from the camera through the communicator. The third step includes displaying, after the recording start instruction information is transmitted, at least one of a scheduled recording period of time and a combination of the scheduled recording start time and the scheduled recording stop time through the monitor. The scheduled recording period of time is based on the scheduled recording start time and the scheduled recording stop time stored in the memory. The fourth step includes displaying, after the moving image recording information is received, at least one of a recording period of time and a combination of a recording start time and a recording stop time through the monitor. The recording period of time, the recording start time, and the recording stop time are based on the moving image recording information.

According to the aspects described above, at least one of a scheduled recording period of time and a combination of a scheduled recording start time and a scheduled recording stop time is displayed, and at least one of a recording period of time and a combination of a recording start time and a recording stop time is displayed. Therefore, the moving image capturing instructing terminal, the moving image capturing system, the moving image capturing instruction method, and the program can notify the user of the information for checking the timing or the time at which the moving image is recorded.

DETAILED DESCRIPTION

Exemplary embodiments of the present invention will be described with reference to the appended drawings.

First Embodiment

Figure 1:
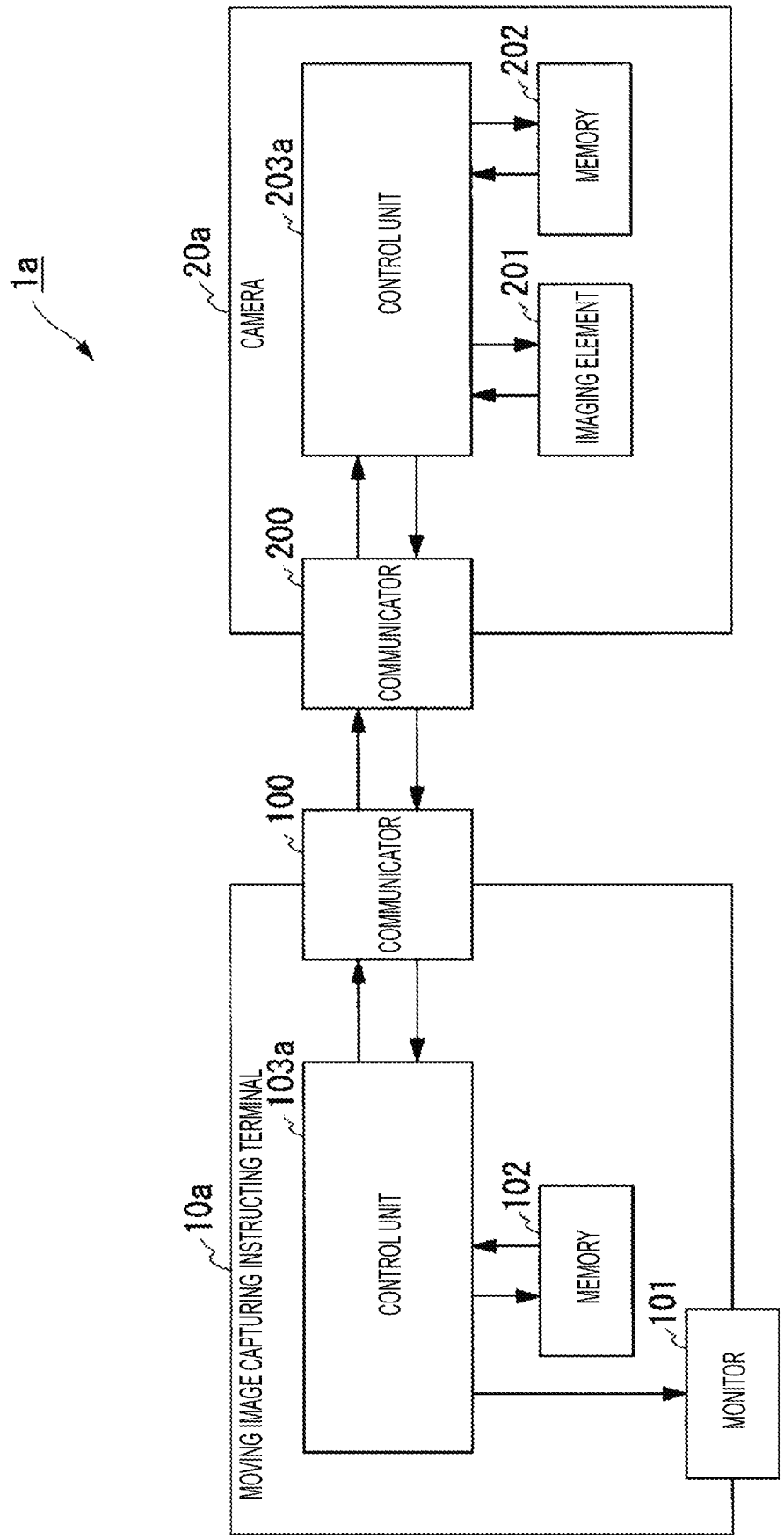
FIG. 1 is a block diagram illustrating a configuration of a moving image capturing system according to a first embodiment of the present invention.

FIG. 1 illustrates a configuration of a moving image capturing system 1a according to a first embodiment of the present invention. The moving image capturing system 1a includes a moving image capturing instructing terminal 10a and a camera 20a that captures and records a moving image as illustrated in FIG. 1. For example, the moving image capturing instructing terminal 10a is a smartphone.

The moving image capturing instructing terminal 10a includes a communicator 100 (a first communicator), a monitor 101, a memory 102 (a first memory), and a control unit 103a (a first control unit). Each of the components of the moving image capturing instructing terminal 10a illustrated in FIG. 1 is hardware. The communicator 100 is a wireless transceiver. The monitor 101 is a display. The memory 102 is a volatile or non-volatile recording medium. The control unit 103a (controller) includes one or more processors. The processor may include an application specific integrated circuit (ASIC).

The control unit 103a transmits information to the camera 20a through the communicator 100. Specifically, the control unit 103a causes the communicator 100 to transmit information related to the camera 20a. Accordingly, the communicator 100 transmits information to the camera 20a. The control unit 103a receives information and an image from the camera 20a through the communicator 100. Specifically, the control unit 103a causes the communicator 100 to receive information and an image from the camera 20a. Accordingly, the communicator 100 receives information and an image from the camera 20a.

The control unit 103a displays information and an image through the monitor 101. Specifically, the control unit 103a causes the monitor 101 to display information and an image. Accordingly, the monitor 101 displays information and an image.

The communicator 100 performs wireless communication with the camera 20a. The memory 102 stores a scheduled recording start time and a scheduled recording stop time. The control unit 103a transmits recording start instruction information to the camera 20a through the communicator 100. The recording start instruction information indicates an instruction to start capturing and recording of a moving image. After the recording start instruction information is transmitted, the control unit 103a receives the moving image recording information related to the recording of the moving image from the camera 20a through the communicator 100. After the recording start instruction information is transmitted, the control unit 103a displays at least one of a scheduled recording period of time and a combination of the scheduled recording start time and the scheduled recording stop time through the monitor 101. The scheduled recording period of time is based on the scheduled recording start time and the scheduled recording stop time. After the moving image recording information is received, the control unit 103a displays at least one of a recording period of time and a combination of a recording start time and a recording stop time through the monitor 101. The recording period of time, the recording start time, and the recording stop time are based on the moving image recording information.

For example, a function of the control unit 103a can be implemented as a function of software by reading and executing a program including commands specifying an operation of the control unit 103a through a computer of the moving image capturing instructing terminal 10a. For example, the program may be provided by a "computer readable recording medium" such as a flash memory. Further, the program may be transmitted from a computer having a storage device or the like in which the program is stored to the moving image capturing instructing terminal 10a via a transmission medium or a transmission wave in the transmission medium. The "transmission medium" of transmitting the program is a medium having a function of transmitting information such as a network (a communication network) such as the Internet or a communication line (a communication wire) such as a telephone line. Further, the program may realize some of the functions described above. Further, the program may be a differential file (a differential program) which can realize the above-described functions through a combination with a program already recorded in a computer.

The camera 20a includes a communicator 200 (a second communicator), an imaging element 201, a memory 202 (a second memory), and a control unit 203a (a second control unit). Each of the components of the camera 20a illustrated in FIG. 1 is hardware. The communicator 200 is a wireless transceiver. The imaging element 201 is an image sensor. The memory 202 is a volatile or non-volatile recording medium. The control unit 203a (controller) includes one or more processors. The processor may include an ASIC.

The control unit 203a transmits information and an image to the camera 20a through the communicator 200. Specifically, the control unit 203a causes the communicator 200 to transmit information and an image related to the moving image capturing instructing terminal 10a. Accordingly, the communicator 200 transmits information and an image to the moving image capturing instructing terminal 10a. The control unit 203a receives information from the moving image capturing instructing terminal 10a through the communicator 200. Specifically, the control unit 203a causes the communicator 200 to receive information from the moving image capturing instructing terminal 10a. Accordingly, the communicator 200 receives information from the moving image capturing instructing terminal 10a.

The control unit 203a captures a moving image through the imaging element 201. Specifically, the control unit 203a causes the imaging element 201 to capture a moving image. Accordingly, the imaging element 201 captures a moving image.

The communicator 200 performs wireless communication with the moving image capturing instructing terminal 10a. The control unit 203a receives the recording start instruction information from the moving image capturing instructing terminal 10a through the communicator 200. After the recording start instruction information is received, the control unit 203a starts the capturing of the moving image by the imaging element 201. After the capturing of the moving image is started, the control unit 203a stops the capturing of the moving image by the imaging element 201. After the capturing of the moving image is started, the control unit 203a records the moving image in the memory 202 before the capturing of the moving image is stopped. After the capturing of the moving image is stopped, the control unit 203a transmits the moving image recording information to the moving image capturing instructing terminal 10a through the communicator 200.

For example, the function of the control unit 203a can be implemented as a software function by reading and executing a program including commands specifying the operation of the control unit 203a through a computer of the camera 20a. An implementation form of the program is similar to the implementation form of the program of implementing the function of the control unit 103a.

Figure 2:
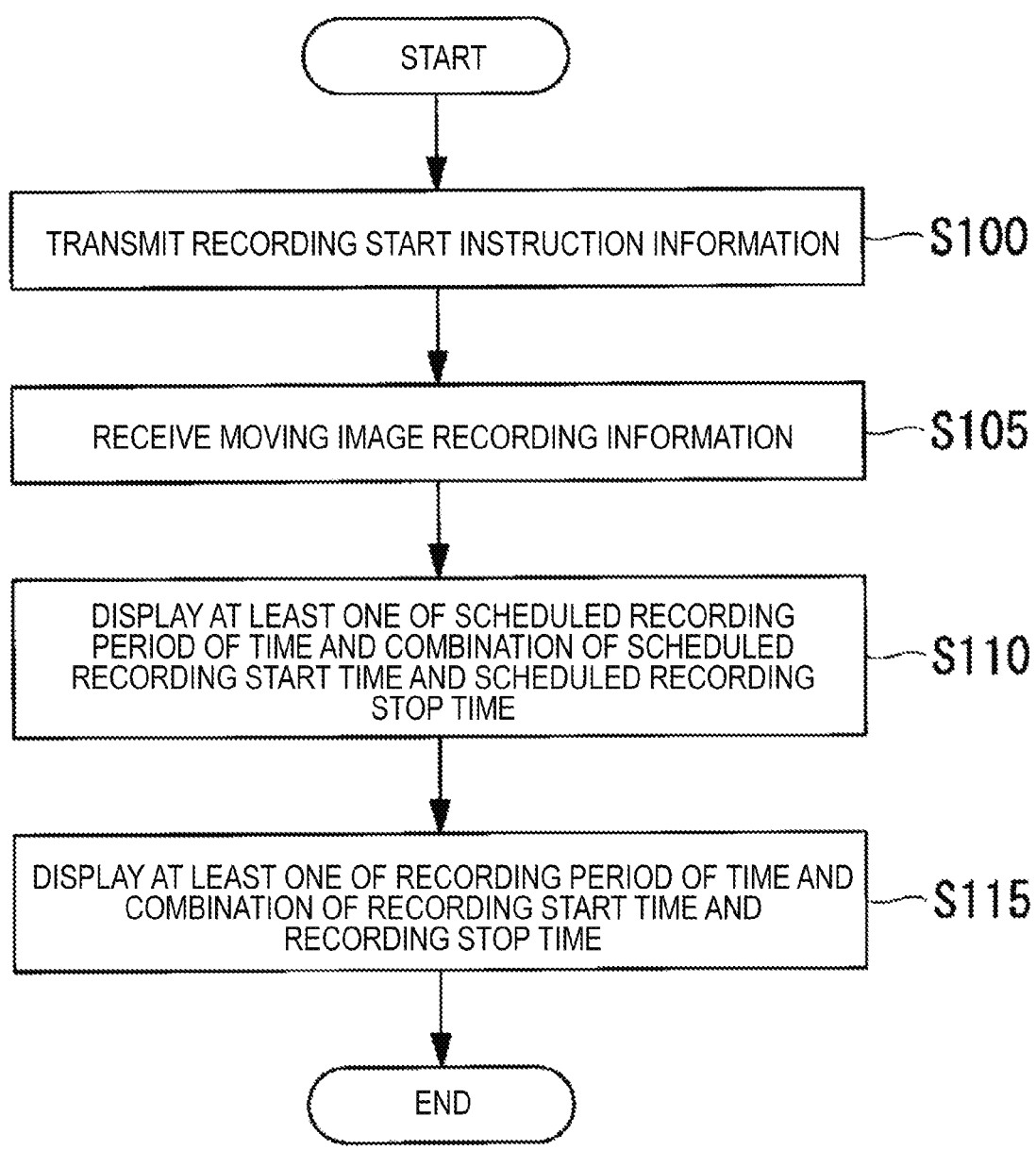
FIG. 2 is a flowchart illustrating a procedure of operations of a moving image capturing instructing terminal according to the first embodiment of the present invention.

FIG. 2 illustrates a procedure of an operation of the moving image capturing instructing terminal 10a. A moving image capturing instruction method by the moving image capturing instructing terminal 10a will be described with reference to FIG. 2.

The control unit 103a transmits the recording start instruction information to the camera 20a through the communicator 100 (step S100). After the recording start instruction information is transmitted in step S100, the control unit 103a receives the moving image recording information related to the recording of the moving image from the camera 20a through the communicator 100 (step S105). After the recording start instruction information is transmitted in step S100, the control unit 103a displays at least one of the scheduled recording period of time and the combination of the scheduled recording start time and the scheduled recording stop time through the monitor 101 (step S110). For example, the scheduled recording period of time is a period of time between the scheduled recording start time and the scheduled recording stop time stored in the memory 102. After the moving image recording information is received in step S105, the control unit 103a displays at least one of the recording period of time and the combination of the recording start time and the recording stop time through the monitor 101 (step S115). The recording period of time corresponds to a period of time of the moving image time recorded in the memory 202 in the camera 20a. The recording start time corresponds to a time at which the recording of the moving image is started in the camera 20a. The recording stop time corresponds to a time at which the recording of the moving image is stopped in the camera 20a.

In step S110, only the scheduled recording period of time may be displayed. In step S110, only the scheduled recording start time and the scheduled recording stop time may be displayed. In step S110, the scheduled recording period of time, the scheduled recording start time, and the scheduled recording stop time may be displayed.

In step S115, only the recording period of time may be displayed. In step S115, only the recording start time and the recording stop time may be displayed. In step S115, the recording period of time, the recording start time, and the recording stop time may be displayed.

Before the process of step S110 is performed, the process of step S115 may be performed.

The moving image capturing instruction method of the first embodiment includes steps S100 (first step), step S105 (second step), step S110 (third step), and step S115 (fourth step).

In the first embodiment, at least one of the scheduled recording period of time and the combination of the scheduled recording start time and the scheduled recording stop time is displayed, and at least one of the recording period of time and the combination of the recording start time and the recording stop time is displayed. Therefore, the moving image capturing instructing terminal 10a can notify the user of the information for checking the timing or the time at which the moving image is recorded. The user can check whether or not the moving image of the timing or the time intended by the user includes been recorded by the camera 20a on the basis of the information displayed on the monitor 101.

Second Embodiment

Figure 3:
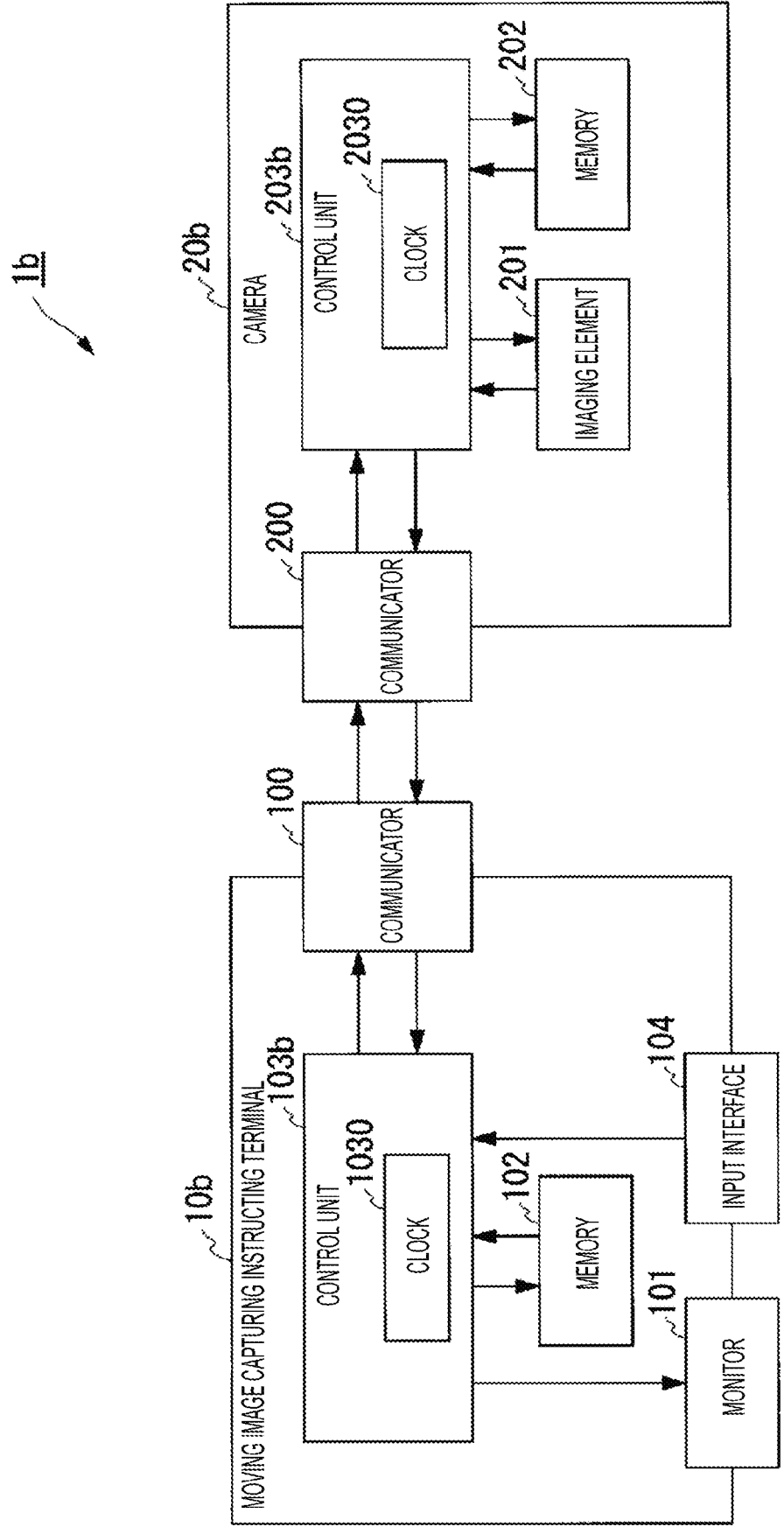
FIG. 3 is a block diagram illustrating a configuration of a moving image capturing system according to a second embodiment of the present invention.

FIG. 3 illustrates a configuration of a moving image capturing system 1b according to the second embodiment of the present invention. The configuration illustrated in FIG. 3 will be described focusing on points different from the configuration illustrated in FIG. 1.

The moving image capturing instructing terminal 10a in the moving image capturing system 1a of the first embodiment is replaced with a moving image capturing instructing terminal 10b, and the camera 20a in the moving image capturing system 1a of the first embodiment is replaced with a camera 20b. The moving image capturing instructing terminal 10b includes a communicator 100 (a first communicator), a monitor 101, a memory 102 (a first memory), a control unit 103b, and an input interface 104 as illustrated in FIG. 3. The control unit 103a in the moving image capturing instructing terminal 10a of the first embodiment is replaced with the control unit 103b. For example, the input interface 104 is one of a button, a switch, a key, a mouse, a touchpanel, a touchpad, a trackball, a pen tablet, and a joystick. The input interface 104 may be a microphone for voice input. The monitor 101 and the input interface 104 may be constituted by a touch panel.

The input interface 104 receives an instruction from the user. When the input interface 104 receives a recording start instruction from the user, the control unit 103b transmits recording start instruction information to the camera 20b through the communicator 100, and the memory 102 stores the scheduled recording start time.

After the recording start instruction information is transmitted, when the input interface 104 receives a recording stop instruction from the user, the control unit 103b transmits recording stop instruction information to the camera 20*b* through the communicator 100, and the memory 102 stores the scheduled recording stop time. The recording stop instruction information indicates an instruction to stop the capturing and the recording of the moving image.

The moving image recording information includes a recording period of time based on a recording start time and a recording stop time. After the moving image recording information is received, the control unit 103*b* displays the recording period of time through the monitor 101.

After the recording start instruction information is transmitted, the control unit 103*b* calculates the scheduled recording period of time on the basis of the scheduled recording start time and the scheduled recording stop time, and the scheduled recording period of time is displayed through the monitor 101.

The control unit 103*b* includes a clock 1030. The clock 1030 generates a time inside the moving image capturing instructing terminal 10*b*.

The camera 20*b* includes a communicator 200 (a second communicator), an imaging element 201, a memory 202 (a second memory), and a control unit 203*b* (a second control unit) as illustrated in FIG. 3. The control unit 203*a* in the camera 20*a* of the first embodiment is replaced with the control unit 203*b*. The control unit 203*b* includes a clock 2030. The clock 2030 generates the time inside the camera 20*b*.

When the recording start instruction information is received, the memory 202 stores the recording start time. The control unit 203*b* receives the recording stop instruction information from the moving image capturing instructing terminal 10*b* through the communicator 200. After the recording stop instruction information is received, the control unit 203*b* stops the capturing of the moving image by the imaging element 201. When the recording stop instruction information is received, the memory 202 stores the recording stop time. In a case in which the recording of the moving image is forcibly stopped in the camera 20*b*, the memory 202 stores a time at which the recording of the moving image is stopped as the recording stop time.

For the remaining points other than the points described above, the configuration illustrated in FIG. 3 is similar to the configuration illustrated in FIG. 1.

Figure 4:
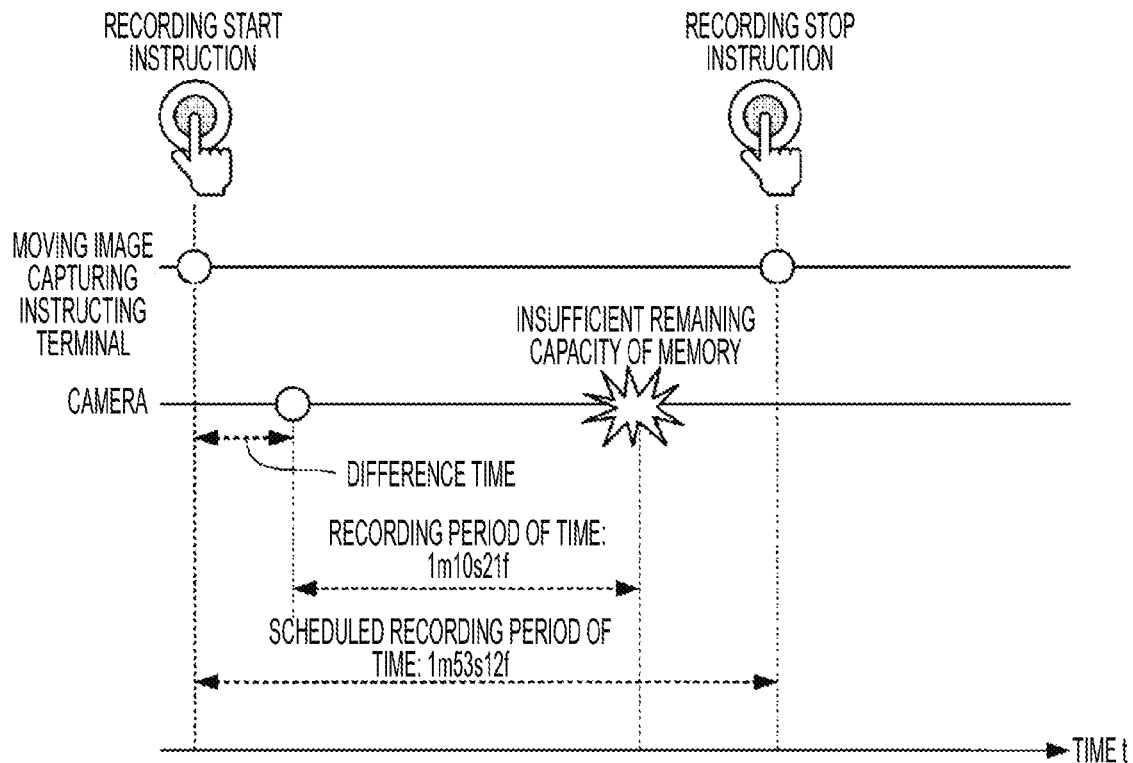
FIG. 4 is a timing chart illustrating events occurring in a moving image capturing instructing terminal and a camera according to the second embodiment of the present invention.

FIG. 4 illustrates events occurring in the moving image capturing instructing terminal 10*b* and the camera 20*b*. Time passes by in a right direction in FIG. 4. Schematic operations of the moving image capturing instructing terminal 10*b* and the camera 20*b* will be described with reference to FIG. 4.

In the moving image capturing instructing terminal 10*b*, the input interface 104 receives the recording start instruction from the user. The recording start instruction information is transmitted to the camera 20*b* on the basis of the recording start instruction. In the camera 20*b*, the communicator 200 receives the recording start instruction information. Due to a delay in the wireless communication, a time at which the moving image capturing instructing terminal 10*b* transmits the recording start instruction information is different from a time at which the camera 20*b* receives the recording start instruction information. The difference between the two times is illustrated in FIG. 4 as a difference time.

In the camera 20*b*, the imaging element 201 starts the capturing of the moving image on the basis of the recording start instruction information. The control unit 203*b* starts the recording of the moving image on the basis of the recording start instruction information. Thereafter, due to the insufficient remaining capacity of the memory 202, the imaging element 201 stops the capturing of the moving image, and the control unit 203*b* stops the recording of the moving image.

After the capturing and the recording of the moving image in the camera 20*b* are stopped, the input interface 104 in the moving image capturing instructing terminal 10*b* receives the recording stop instruction from the user. The recording stop instruction information is transmitted to the camera 20*b* on the basis of the recording stop instruction. In the camera 20*b*, the communicator 200 receives the recording stop instruction information. Before the camera 20*b* receives the recording stop instruction information, the camera 20*b* stops the capturing and the recording of the moving image because of the insufficient remaining capacity of the memory 202.

As illustrated in FIG. 4, the scheduled recording period of time is 1 minute 53 seconds and 12 frames. The scheduled recording period of time is a period of time from the time at which the input interface 104 receives the recording start instruction from the user, that is, the scheduled recording start time to the time at which the input interface 104 receives the recording stop instruction from the user, that is, the scheduled recording stop time. As illustrated in FIG. 4, the recording period of time is 1 minute 10 seconds and 21 frames. The recording period of time is a period of time from a time at which the camera 20*b* starts the recording of the moving image, that is, the recording start time to a time at which the camera 20*b* stops the recording of the moving image, that is, the recording stop time.

Figure 5:
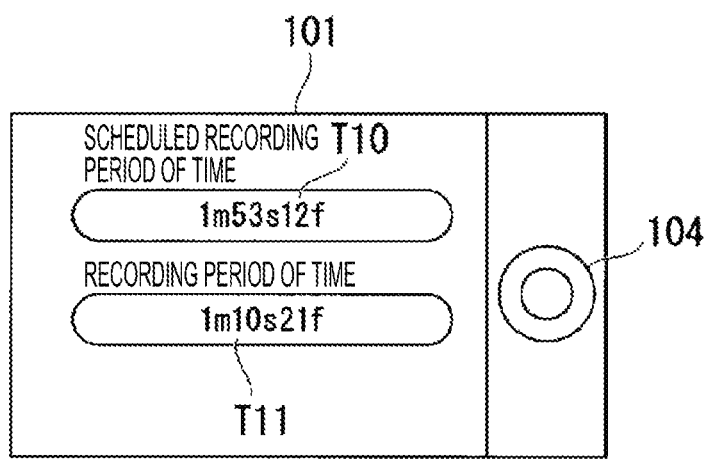
FIG. 5 is a reference diagram illustrating a screen of a monitor according to the second embodiment of the present invention.

FIG. 5 illustrates a screen of the monitor 101. An example in which the monitor 101 and the input interface 104 are configured by a touch panel is illustrated in FIG. 5. The input interface 104 is a record button displayed on the screen of the monitor 101. The user gives an instruction to start or stop the recording by touching the record button. The monitor 101 displays a scheduled recording period of time T10 and a recording period of time T11 using letters.

Figure 6:
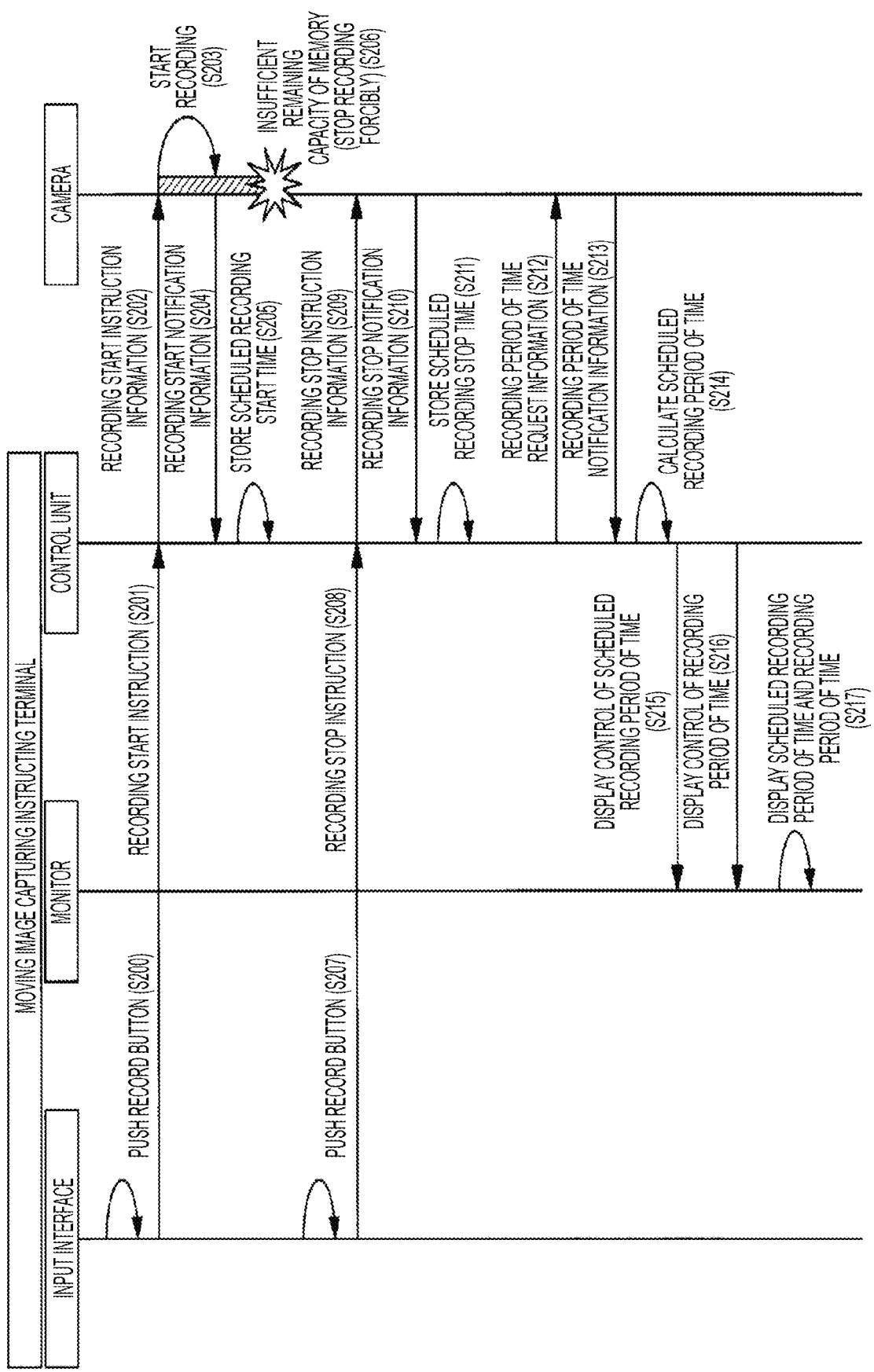
FIG. 6 is a sequence diagram illustrating a procedure of operations of the moving image capturing instructing terminal and the camera according to the second embodiment of the present invention.

FIG. 6 illustrates a procedure of operations of the moving image capturing instructing terminal 10*b* and the camera 20*b*. The operations of the moving image capturing instructing terminal 10*b* and the camera 20*b* will be described with reference to FIG. 6.

In the moving image capturing instructing terminal 10*b*, the input interface 104 receives the recording start instruction from the user (step S200). In the following description, the input interface 104 is the record button illustrated in FIG. 5. In step S200, when the record button is pushed down by the user, the input interface 104 receives the recording start instruction. The input interface 104 gives a notification indicating the recording start instruction received in step S200 to the control unit 103*b* (step S201). In step S201, the control unit 103*b* stores the scheduled recording start time. The scheduled recording start time is a time generated by the clock 1030 when the input interface 104 receives the recording start instruction.

After step S201, the control unit 103*b* generates the recording start instruction information. The control unit 103*b* transmits the recording start instruction information to the camera 20*b* through the communicator 100. In the camera 20*b*, the control unit 203*b* receives the recording start instruction information from the moving image capturing instructing terminal 10*b* through the communicator 200 (step S202).

In the camera 20*b*, the control unit 203*b* starts the capturing and the recording of the moving image on the basis of the recording start instruction information. In other words, the control unit 203*b* starts the capturing of the moving image by the imaging element 201 and starts the recording of the moving image captured by the imaging element 201 in the memory 202 (step S203). In step S203, the control unit 203*b* stores the recording start time in the memory 202. The recording start time is the time generated by the clock 2030 when the control unit 203*b* starts the recording of the moving image. In other words, the recording start time is a time at which the recording of the moving image is started. The recording start time may be a time at which the recording start instruction information is received or a time at which recording start notification information is transmitted.

After step S203, the control unit 203*b* generates the recording start notification information. The recording start notification information indicates that the recording of the moving image is started in the camera 20*b*. The control unit 203*b* transmits the recording start notification information to the moving image capturing instructing terminal 10*b* through the communicator 200. In the moving image capturing instructing terminal 10*b*, the control unit 103*b* receives the recording start notification information from the camera 20*b* through the communicator 100 (step S204). After step S204, the control unit 103*b* stores the scheduled recording start time in the memory 102 (step S205). The scheduled recording start time may be a time at which the recording start instruction information is transmitted.

The capturing and the recording of the moving image are forcibly stopped due to the insufficient remaining capacity of the memory 202 after the capturing and the recording of the moving image are started in the camera 20*b*. In other words, the control unit 203*b* stops the capturing of the moving image by the imaging element 201 and stops the recording of the moving image captured by the imaging element 201 in the memory 202 (step S206). In step S206, the control unit 203*b* stores the recording stop time in the memory 202. The recording stop time is a time generated by the clock 2030 when the control unit 203*b* stops the recording of the moving image. In other words, the recording stop time is a time at which the recording of the moving image is stopped.

In the moving image capturing instructing terminal 10*b*, after the capturing and the recording of the moving image are stopped in the camera 20*b*, the input interface 104 receives the recording stop instruction from the user (step S207). In step S207, when the record button is pushed down by the user, the input interface 104 receives the recording stop instruction. The input interface 104 gives a notification indicating the recording stop instruction received in step S207 to the control unit 103*b* (step S208). In step S208, the control unit 103*b* stores the scheduled recording stop time. The scheduled recording stop time is a time generated by the clock 1030 when the input interface 104 receives the recording stop instruction.

After step S208, the control unit 103*b* generates the recording stop instruction information. The control unit 103*b* transmits the recording stop instruction information to the camera 20*b* through the communicator 100. In the camera 20*b*, the control unit 203*b* receives the recording stop instruction information from the moving image capturing instructing terminal 10*b* through the communicator 200 (step S209).

After step S209, the control unit 203*b* generates recording stop notification information. The recording stop notification information indicates that the recording of the moving image is stopped in the camera 20*b*. The control unit 203*b* transmits the recording stop notification information to the moving image capturing instructing terminal 10*b* through the communicator 200. In the moving image capturing instructing terminal 10*b*, the control unit 103*b* receives the recording stop notification information from camera 20*b* through the communicator 100 (step S210). After step S210, the control unit 103*b* stores the scheduled recording stop time in the memory 102 (step S211). The scheduled recording stop time may be a time at which the recording stop instruction information is transmitted.

In a case in which the recording of the moving image is not forcibly stopped, the control unit 203*b* stops the capturing and the recording of the moving image on the basis of the recording stop instruction information. In other words, the control unit 203*b* stops the capturing of the moving image by the imaging element 201 and stops the recording of the moving image captured by the imaging element 201 in the memory 202. After the recording of the moving image is stopped, the control unit 203*b* stores the recording stop time in the memory 202. The recording stop time may be a time the recording stop instruction information is received or a time at which the recording stop notification information is transmitted.

After step S211, the control unit 103*b* transmits recording period of time request information to the camera 20*b* through the communicator 100. The recording period of time request information indicates an acquisition request of the recording period of time to the camera 20*b*. In the camera 20*b*, the control unit 203*b* receives the recording period of time request information from the moving image capturing instructing terminal 10*b* through the communicator 200 (step S212).

The control unit 203*b* reads the recording start time and the recording stop time from the memory 202 on the basis of the recording period of time request information. The control unit 203*b* calculates the recording period of time by calculating a difference between the recording start time and the recording stop time which are read out. The control unit 203*b* generates recording period of time notification information. The recording period of time notification information includes the calculated recording period of time. The recording period of time notification information corresponds to moving image recording information. The control unit 203*b* transmits the recording period of time notification information to the moving image capturing instructing terminal 10*b* through the communicator 200. In the moving image capturing instructing terminal 10*b*, the control unit 103*b* receives the recording period of time notification information from the camera 20*b* through the communicator 100 (step S213). In step S213, the control unit 103*b* stores the recording period of time included in the received recording period of time notification information in the memory 102.

After step S213, the control unit 103*b* reads the scheduled recording start time and the scheduled recording stop time from the memory 102. The control unit 103*b* calculates the scheduled recording period of time by calculating a difference between the scheduled recording start time and the scheduled recording stop time which are read out (step S214). In step S214, the control unit 103*b* stores the calculated scheduled recording period of time in the memory 102. Before the process of step S212 is performed, the process of step S214 may be performed.

After step S214, the control unit 103*b* performs display control such that the scheduled recording period of time is displayed on the monitor 101 (step S215). In step S215, the control unit 103*b* reads the scheduled recording period of time from the memory 102 and performs display control on the basis of the read scheduled recording period of time. After step S215, the control unit 103*b* performs display control such that the recording period of time is displayed on the monitor 101 (step S216). In step S216, the control unit 103b reads the recording period of time from the memory 102 and performs display control on the basis of the read recording period of time. The monitor 101 displays the scheduled recording period of time and the recording period of time (step S217).

The memory 102 may store a program in which the operation of the control unit 103b is specified. The control unit 103b may transmit the recording start instruction information to the camera 20b through the communicator 100 in accordance with the program. When the control unit 103b transmits the recording start instruction information to the camera 20b through the communicator 100, the memory 102 may store the scheduled recording start time. After the recording start instruction information is transmitted, the control unit 103b may transmit the recording stop instruction information to the camera 20b through the communicator 100 in accordance with the program. The recording stop instruction information indicates an instruction to stop the capturing and the recording of the moving image. When the control unit 103b transmits the recording stop instruction information to the camera 20b through the communicator 100, the memory 102 may store the scheduled recording stop time.

In the operation according to the program, when a predetermined recording start condition is satisfied, the recording start instruction information is transmitted to the camera 20b, and when a predetermined recording stop condition is satisfied, the recording stop instruction information is transmitted to the camera 20b. For example, when the time reaches a predetermined recording start time, the recording start instruction information may be transmitted to the camera 20b in accordance with the program, and when the time reaches a predetermined recording stop time, the recording stop instruction information may be transmitted to the camera 20b in accordance with the program. In a case in which the operation according to the program is performed, the input interface 104 is unnecessary.

The moving image capturing instruction method of the second embodiment includes step S202 (first step), step S213 (second step), steps S215 and S217 (third step), steps S216 and S217 (fourth step). The moving image capturing instruction method of each aspect of the present invention may not have steps other than step corresponding to the first to fourth steps.

In the second embodiment, the scheduled recording period of time and the recording period of time are displayed. Therefore, the moving image capturing instructing terminal 10b can notify the user of the information for checking the time at which the moving image is recorded. The user can check whether or not the moving image of the time intended by the user is recorded by the camera 20b on the basis of the information displayed on the monitor 101. For example, in a case in which the scheduled recording period of time and the recording period of time are significantly different, the user can understand that there is a high possibility that the moving image of the time intended by the user is not captured by the camera 20b.

Since the moving image capturing instructing terminal 10b includes the input interface 104, the user can give an instruction to start and stop the recording of the moving image at a timing desired by the user.

First Modified Example of Second Embodiment

Figure 7:
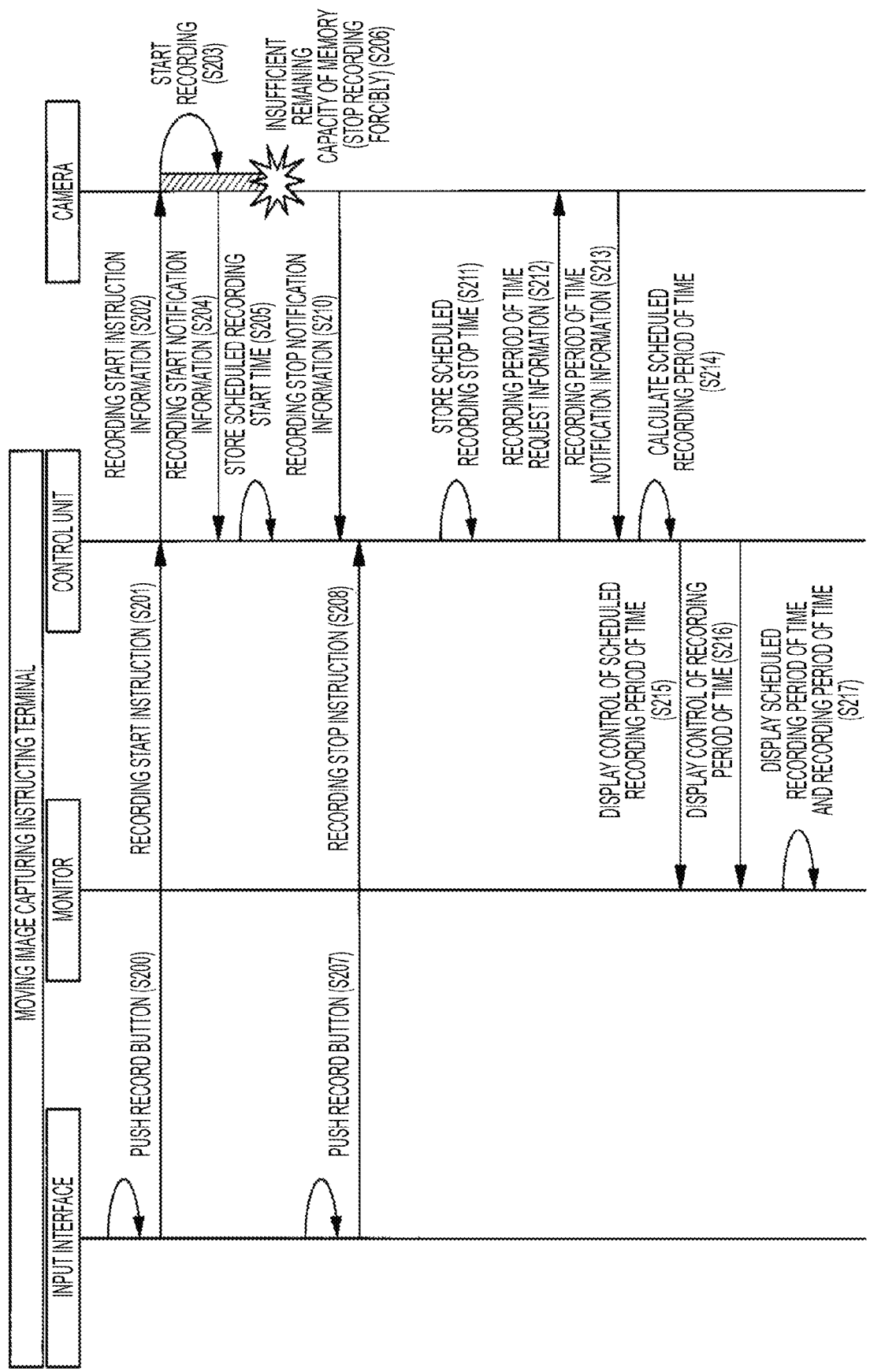
FIG. 7 is a sequence diagram illustrating a procedure of operations of a moving image capturing instructing terminal and a camera according to a first modified example of the second embodiment of the present invention.

FIG. 7 illustrates a procedure of operations of the moving image capturing instructing terminal 10b and the camera 20b of the first modified example of the second embodiment. The operations illustrated in FIG. 7 will be described focusing on differences from the operation illustrated in FIG. 6.

In a case in which the recording of the moving image is stopped due to the insufficient remaining capacity of memory 202, the recording stop notification information is transmitted. In other words, after step S206, the control unit 203b generates the recording stop notification information. The control unit 203b transmits the recording stop notification information to the moving image capturing instructing terminal 10b through the communicator 200. In the moving image capturing instructing terminal 10b, control unit 103b receives the recording stop notification information from the camera 20b through the communicator 100 (step S210).

The control unit 103b determines that the recording of the moving image includes stopped on the basis of the recording stop notification information. After step S208, the control unit 103b does not perform a process of step S209.

For the remaining points other than the points described above, the operation illustrated in FIG. 7 is similar to the operation illustrated in FIG. 6.

Second Modified Example of Second Embodiment

In a second modified example of the second embodiment, the moving image recording information includes one of information including the recording start time which is received from the camera 20b through the communicator 100 and information which is transmitted from the camera 20b at the recording start time and received through the communicator 100. The moving image recording information includes one of information including the recording stop time which is received from the camera 20b through the communicator 100 and information which is transmitted from the camera 20b at the recording stop time and received through the communicator 100. After the moving image recording information is received, control unit 103b performs one of a first process and a second process. In the first process, the control unit 103b calculates the recording period of time on the basis of the recording start time and the recording stop time, and displays the recording period of time through the monitor 101. In the second process, the control unit 103b displays the combination of the recording start time and the recording stop time through the monitor 101. An example in which the second process is performed will be described below.

In a case in which the moving image recording information is the information including the recording start time, the control unit 103b can acquire the recording start time from the moving image recording information. In a case in which the moving image recording information is the information which is transmitted from the camera 20b at the recording start time, the control unit 103b can acquire the recording start time on the basis of the time at which the moving image recording information is received. In a case in which the moving image recording information is the information including the recording stop time, the control unit 103b can acquire the recording stop time from the moving image recording information. In a case in which the moving image recording information is the information which is transmitted from the camera 20b at the recording stop time, the control unit 103b can acquire the recording stop time on the basis of the time at which the moving image recording information is received.

After the recording start instruction information is transmitted, the control unit 103b displays the combination of the scheduled recording start time and the scheduled recording stop time through the monitor 101.

Figure 8:
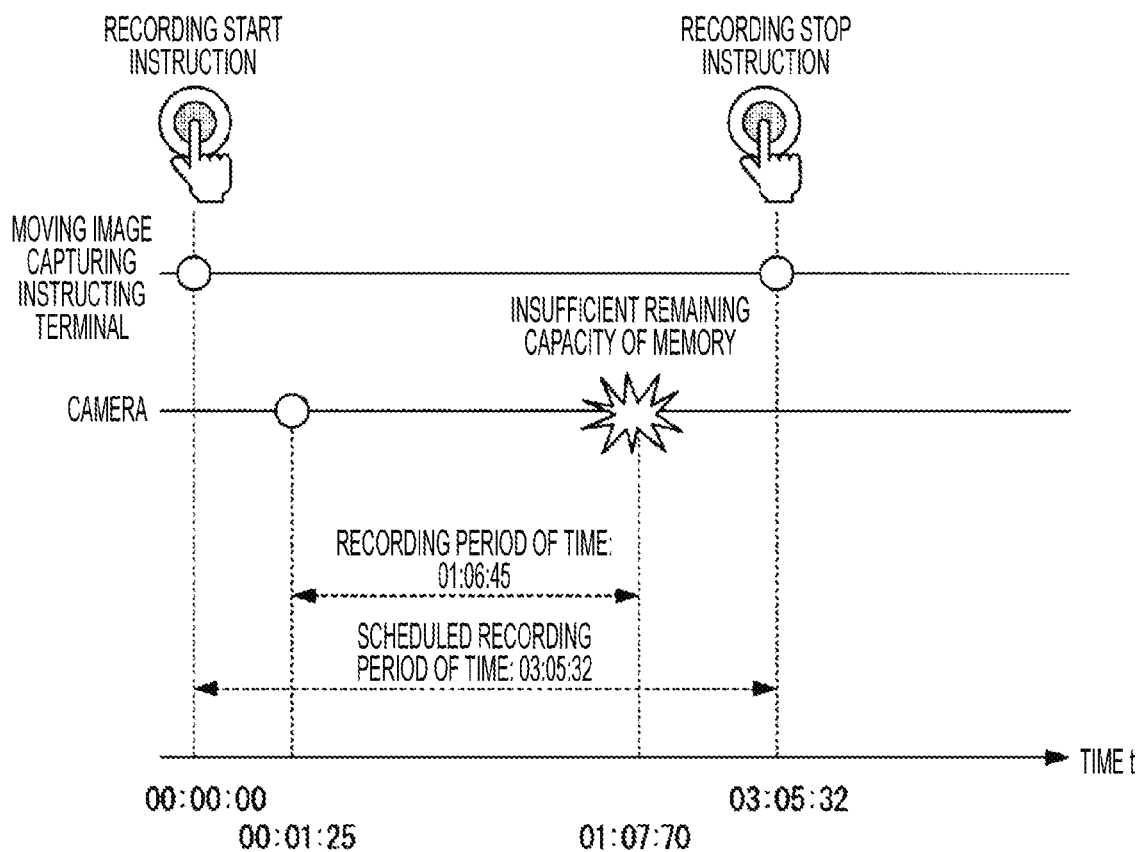
FIG. 8 is a timing chart illustrating events occurring in a moving image capturing instructing terminal and a camera according to a second modified example of the second embodiment of the present invention.

FIG. 8 illustrates events occurring in the moving image capturing instructing terminal 10*b* and the camera 20*b*. Time passes by in the right direction in FIG. 8. Schematic operations of the moving image capturing instructing terminal 10*b* and the camera 20*b* will be described with reference to FIG. 8.

In the moving image capturing instructing terminal 10*b*, the input interface 104 receives the recording start instruction from the user. The scheduled recording start time is "00:00:00". The recording start instruction information is transmitted to the camera 20*b* on the basis of the recording start instruction. In the camera 20*b*, the communicator 200 receives the recording start instruction information. Due to the delay in the wireless communication, the time at which the moving image capturing instructing terminal 10*b* transmits the recording start instruction information is different from the time at which the camera 20*b* receives the recording start instruction information.

In the camera 20*b*, the imaging element 201 starts the capturing of the moving image on the basis of the recording start instruction information. The control unit 203*b* starts the recording of the moving image on the basis of the recording start instruction information. The recording start time is "00:01:25". Thereafter, due to the insufficient remaining capacity of the memory 202, the imaging element 201 stops the capturing of the moving image, and the control unit 203*b* stops the recording of the moving image. The recording stop time is "01:07:70".

After the capturing and the recording of the moving image in the camera 20*b* are stopped, the input interface 104 in the moving image capturing instructing terminal 10*b* receives the recording stop instruction from the user. The scheduled recording stop time is "03:05:32". The recording stop instruction information is transmitted to the camera 20*b* on the basis of the recording stop instruction. In the camera 20*b*, the communicator 200 receives the recording stop instruction information. Before the camera 20*b* receives the recording stop instruction information, the camera 20*b* stops the capturing and the recording of the moving image because of the insufficient remaining capacity of the memory 202.

As illustrated in FIG. 8, the scheduled recording period of time is "03:05:32". The scheduled recording period of time is a period of time from the scheduled recording start time to the scheduled recording stop time. As illustrated in FIG. 8, the recording period of time is "01:06:45". The recording period of time is a period of time from the recording start time to the recording stop time.

Figure 9:
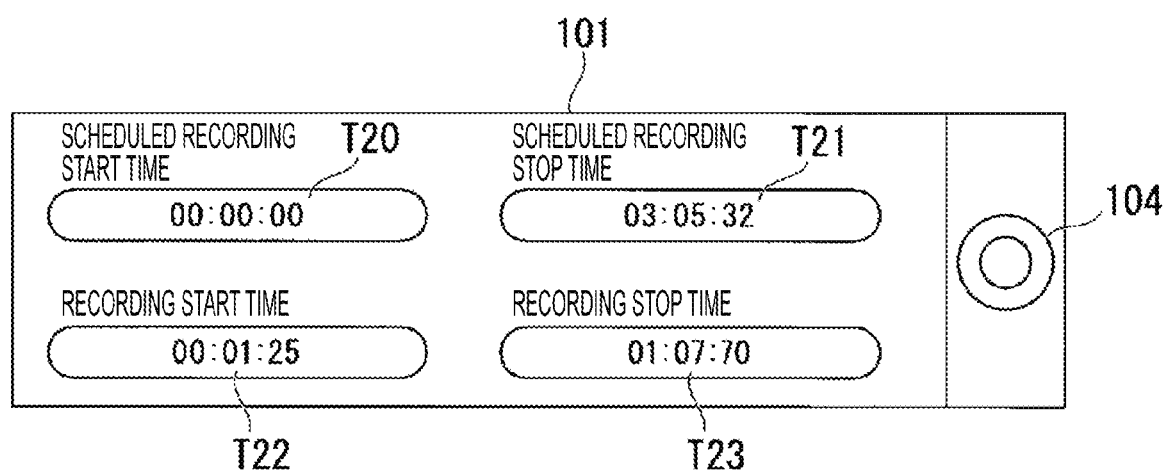
FIG. 9 is a reference diagram illustrating a screen of a monitor of the second modified example of the second embodiment of the present invention.

FIG. 9 illustrates a screen of the monitor 101. An example in which the monitor 101 and the input interface 104 are constituted by a touch panel is illustrated in FIG. 9. The input interface 104 is a record button displayed on the screen of the monitor 101. The monitor 101 displays a scheduled recording start time T20, a scheduled recording stop time T21, a recording start time T22, and a recording stop time T23 using letters.

The operations of the moving image capturing instructing terminal 10*b* and the camera 20*b* are similar to those illustrated in FIG. 6 except for the following points. After step S203, the control unit 203*b* generates the recording start notification information. The recording start notification information includes the recording start time. The recording start notification information corresponds to the moving image recording information. The control unit 203*b* transmits the recording start notification information to the moving image capturing instructing terminal 10*b* through the communicator 200. In the moving image capturing instructing terminal 10*b*, the control unit 103*b* receives the recording start notification information from the camera 20*b* through the communicator 100 (step S204). In step S204, the control unit 103*b* stores the recording start time included in the recording start notification information in the memory 102.

After step S206, the control unit 203*b* generates the recording stop notification information. The recording stop notification information includes the recording stop time. The recording stop notification information corresponds to the moving image recording information. The control unit 203*b* transmits the recording stop notification information to the moving image capturing instructing terminal 10*b* through the communicator 200. In the moving image capturing instructing terminal 10*b*, the control unit 103*b* receives the recording stop notification information from the camera 20*b* through the communicator 100 (step S210). In step S210, the control unit 103*b* stores the recording stop time included in the recording stop notification information in the memory 102.

After step S210, the control unit 103*b* reads the recording start time and the recording stop time from the memory 102. The control unit 103*b* calculates the recording period of time by calculating a difference between the recording start time and the recording stop time which are read out. The control unit 103*b* stores the calculated recording period of time in the memory 102. The process of step S212 and step S213 is not performed.

The recording start notification information may not include the recording start time. The control unit 103*b* may store a time at which the recording start notification information is received in the memory 102 as the recording start time. The recording stop notification information may not include the recording stop time. The control unit 103*b* may store a time at which the recording stop notification information is received in the memory 102 as a recording stop time.

The camera 20*b* may transmit time notification information including the recording start time to the moving image capturing instructing terminal 10*b*. After the time notification information is received, the control unit 103*b* may store the recording start time included in the time notification information in the memory 102. The camera 20*b* may transmit time notification information including the recording stop time to the moving image capturing instructing terminal 10*b*. After the time notification information is received, the control unit 103*b* may store the recording stop time included in the time notification information in the memory 102.

In a case in which the time of the moving image capturing instructing terminal 10*b* is synchronized with the time of the camera 20*b*, and the notification of the recording start time and the recording stop time is given from the camera 20*b* to the moving image capturing instructing terminal 10*b*, the moving image capturing instructing terminal 10*b* can acquire the recording start time and the recording stop time which are accurate. In a case in which the time at which the recording start notification information is received is stored in the memory 102 as the recording start time, and the time at which the recording stop notification information is received is stored in the memory 102 as the recording stop time, the time of the moving image capturing instructing terminal 10*b* may not be synchronized with the time of the camera 20*b*.

As described above, after the recording start notification information and the recording stop notification information are received, in the second process, the control unit 103*b* displays the combination of the recording start time and the recording stop time through the monitor 101. The recording period of time may be displayed instead of the recording start time and the recording stop time as described in the second embodiment. In other words, after the recording start notification information and the recording stop notification information are received, in the first process, the control unit 103*b* may calculate the recording period of time on the basis of the recording start time and the recording stop time and display the recording period of time through the monitor 101.

The scheduled recording period of time may be displayed instead of the scheduled recording start time and the scheduled recording stop time as described in the second embodiment. In other words, after the recording start instruction information is transmitted, the control unit 103*b* may calculate the scheduled recording period of time on the basis of the scheduled recording start time and the scheduled recording stop time and display the scheduled recording period of time through the monitor 101.

In the second modified example of the second embodiment, the scheduled recording start time, the scheduled recording stop time, the recording start time, and the recording stop time are displayed. Therefore, the moving image capturing instructing terminal 10*b* can notify the user of the information for checking the time at which the moving image is recorded. The user can check whether or not the moving image of the time intended by the user is recorded by the camera 20*b* on the basis of the information displayed on the monitor 101. For example, in a case in which the scheduled recording start time and the recording start time are significantly different or in a case in which the scheduled recording stop time and the recording stop time are significantly different, the user can understand that there is a high possibility that the moving image of the time intended by the user is not captured by the camera 20*b*.

Third Embodiment

A third embodiment of the present invention will be described using the moving image capturing system 1*b* according to the second embodiment of the present invention. The method of calculating the recording period of time according to the third embodiment is different from the method of calculating the recording period of time according to the first embodiment. After the moving image recording information is received, the control unit 103*b* calculates the recording period of time on the basis of the recording start time and the scheduled recording stop time and displays the recording period of time through the monitor 101.

Even in a case in which the difference between the scheduled recording period of time and the period of time in which the moving image is actually recorded by the camera is small, the moving image of the time intended by the user is not necessarily recorded. When the user gives an instruction to start or stop the recording of the moving image, the start or the stop of the recording of the moving image may be delayed in the camera 20*b* due to the delay in the wireless communication. In a case in which the scheduled recording start time and the recording start time are significantly different due to the delay in the wireless communication, it is highly likely that the moving image of the time intended by the user will not be recorded. The moving image recorded after the time at which the user gives the instruction to stop the recording of the moving image, that is, the scheduled recording stop time is unnecessary for the user. It is important to the user whether or not the moving image is recorded within a period before the scheduled recording stop time. In other words, the period of time in which the moving image is actually recorded within the period of the scheduled recording period of time is important. Therefore, the control unit 103*b* calculates the recording period of time by calculating the difference between the recording start time and the scheduled recording stop time.

After the recording start instruction information is transmitted, the control unit 103*b* calculates the scheduled recording period of time on the basis of the scheduled recording start time and the scheduled recording stop time, and the scheduled recording period of time is displayed through the monitor 101. The control unit 103*b* calculates the scheduled recording period of time by calculating the difference between the scheduled recording start time and the scheduled recording stop time.

The moving image recording information includes one of information including the recording start time which is received from the camera 20*b* through the communicator 100 and information which is transmitted from the camera 20*b* at the recording start time and received through the communicator 100. After the moving image recording information is received, the control unit 103*b* calculates the recording period of time on the basis of the recording start time and the scheduled recording stop time and displays the recording period of time through the monitor 101.

Before the recording start instruction is transmitted from the moving image capturing instructing terminal 10*b*, the time of the moving image capturing instructing terminal 10*b* is synchronized with the time of the camera 20*b*. The time of the moving image capturing instructing terminal 10*b* may be synchronized with the time of the camera 20*b* through wireless communication. In this case, time lag due to communication delay may occur. A global positioning system (GPS) receiving module may be installed in each of the moving image capturing instructing terminal 10*b* and the camera 20*b*. The moving image capturing instructing terminal 10*b* and the camera 20*b* may be connected to a master device in a wired manner, and the time may be set on the basis of a time of the master device. For example, the master device is a personal computer or a GPS logger.

Figure 10:
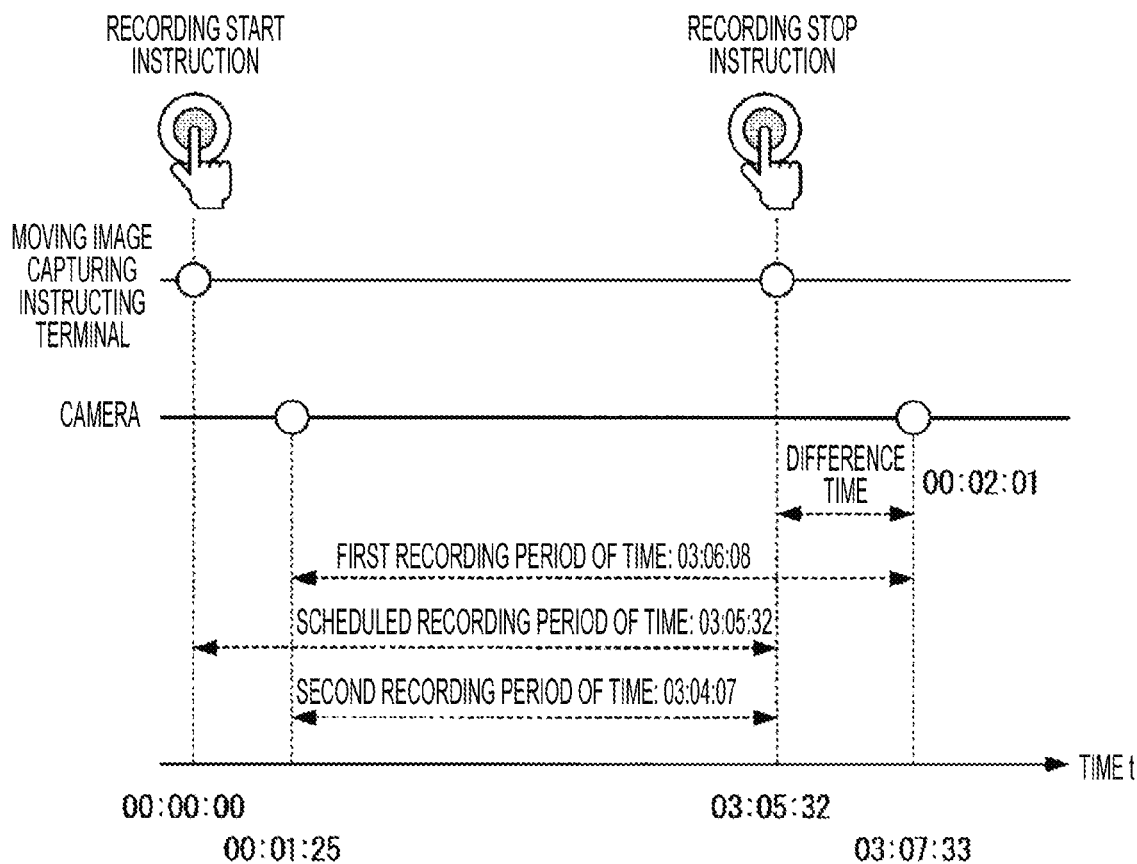
FIG. 10 is a timing chart illustrating events occurring in a moving image capturing instructing terminal and a camera according to a third embodiment of the present invention.

FIG. 10 illustrates events occurring in the moving image capturing instructing terminal 10*b* and the camera 20*b*. Time passes by in the right direction in FIG. 10. Schematic operations of the moving image capturing instructing terminal 10*b* and the camera 20*b* will be described with reference to FIG. 10.

In the moving image capturing instructing terminal 10*b*, the input interface 104 receives the recording start instruction from the user. The scheduled recording start time is "00:00:00". The recording start instruction information is transmitted to the camera 20*b* on the basis of the recording start instruction. In the camera 20*b*, the communicator 200 receives the recording start instruction information. Due to the delay in the wireless communication, the time at which the moving image capturing instructing terminal 10*b* transmits the recording start instruction information is different from the time at which the camera 20*b* receives the recording start instruction information.

In the camera 20*b*, the imaging element 201 starts the capturing of the moving image on the basis of the recording start instruction information. The control unit 203*b* starts the recording of the moving image on the basis of the recording start instruction information. The recording start time is "00:01:25".

In the moving image capturing instructing terminal 10b, the input interface 104 receives the recording stop instruction from the user. The scheduled recording stop time is "03:05:32". The recording stop instruction information is transmitted to the camera 20b on the basis of the recording stop instruction. In the camera 20b, the communicator 200 receives the recording stop instruction information. Due to the delay in the wireless communication, the time at which the moving image capturing instructing terminal 10b transmits the recording stop instruction information is different from the time at which the camera 20b receives the recording stop instruction information. A difference between the two times is illustrated in FIG. 10 as a difference time.

In the camera 20b, the imaging element 201 stops the capturing of the moving image on the basis of the recording stop instruction information. The control unit 203b stops the recording of the moving image on the basis of the recording stop instruction information. The recording stop time is "03:07:33".

The scheduled recording period of time is "03:05:32" as illustrated in FIG. 10. The scheduled recording period of time is a period of time from the scheduled recording start time to the scheduled recording stop time. As illustrated in FIG. 10, a first recording period of time is "03:06:08". The first recording period of time is a period of time from the recording start time to the recording stop time. A second recording period of time is "03:04:07" as illustrated in FIG. 10. The second recording period of time is a period of time from the recording start time to the scheduled recording stop time.

Figure 11:
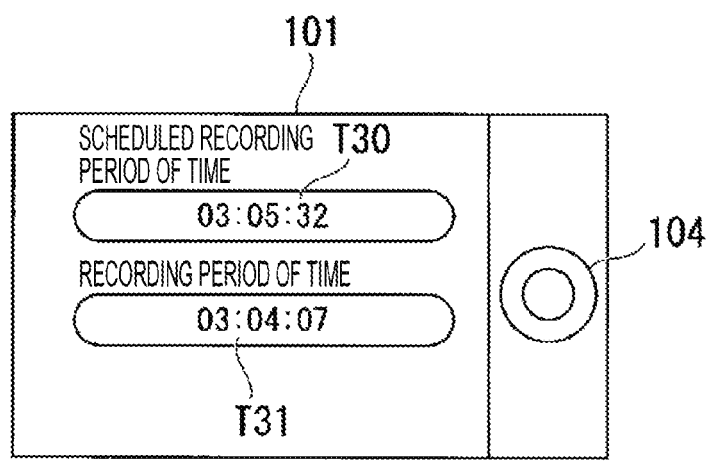
FIG. 11 is a reference diagram illustrating a screen of a monitor according to the third embodiment of the present invention.

FIG. 11 illustrates a screen of the monitor 101. An example in which the monitor 101 and the input interface 104 are constituted by a touch panel is illustrated in FIG. 11. The input interface 104 is a record button displayed on the screen of the monitor 101. The monitor 101 displays a scheduled recording period of time T30 and a recording period of time T31 using letters. The recording period of time T31 is the second recording period of time in FIG. 10.

Figure 12:
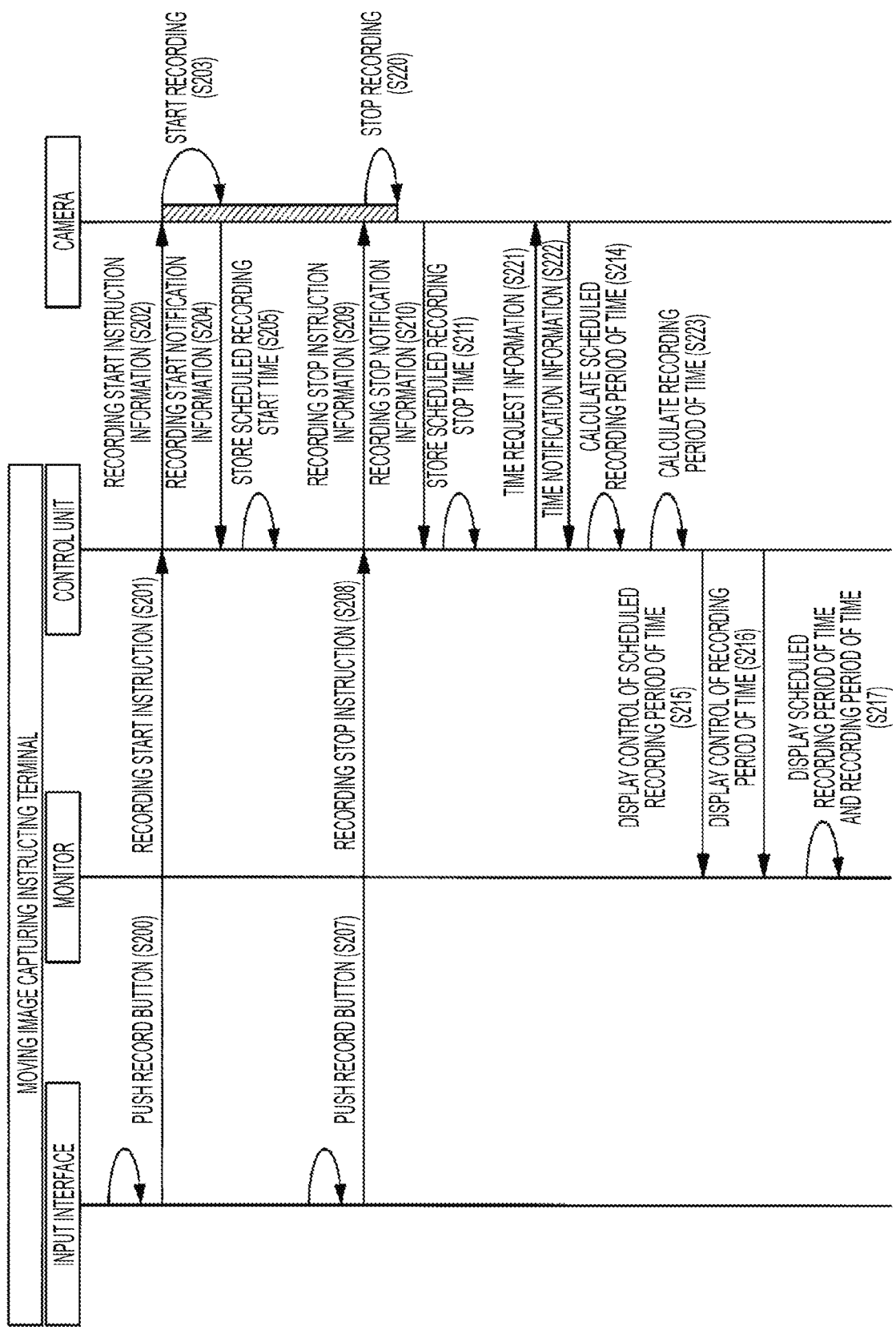
FIG. 12 is a sequence diagram illustrating a procedure of operations of the moving image capturing instructing terminal and the camera according to the third embodiment of the present invention.

FIG. 12 illustrates a procedure of operations of the moving image capturing instructing terminal 10b and the camera 20b. The operations illustrated in FIG. 12 will be described focusing on differences from the operation illustrated in FIG. 6.

In the camera 20b, the control unit 203b stops the capturing and the recording of the moving image on the basis of the recording stop instruction information received in step S209. In other words, the control unit 203b stops the capturing of the moving image by the imaging element 201 and stops the recording of the moving image captured by the imaging element 201 in the memory 202 (step S220).

After step S211, the control unit 103b transmits the time request information to the camera 20b through the communicator 100. The time request information indicates an acquisition request of the recording start time to the camera 20b. In the camera 20b, the control unit 203b receives the time request information from the moving image capturing instructing terminal 10b through the communicator 200 (step S221).

The control unit 203b reads the recording start time from the memory 202 on the basis of the time request information. The control unit 203b generates the time notification information. The time notification information includes the recording start time read from the memory 202. The time notification information corresponds to the moving image recording information. The control unit 203b transmits the time notification information to the moving image capturing instructing terminal 10b through the communicator 200. In the moving image capturing instructing terminal 10b, the control unit 103b receives the time notification information from the camera 20b through the communicator 100 (step S222). In step S222, the control unit 103b stores the recording start time included in the received time notification information in the memory 102.

After step S214, the control unit 103b reads the recording start time and the scheduled recording stop time from the memory 102. The control unit 103b calculates the recording period of time by calculating the difference between the recording start time and the scheduled recording stop time which are read out (step S223). In step S223, the control unit 103b stores the calculated recording period of time in the memory 102. Before the process of step S214 is performed, the process of step S223 may be performed.

For the remaining points other than the points described above, the operation illustrated in FIG. 12 is similar to the operation illustrated in FIG. 6.

The control unit 103b may store the time at which the recording start notification information is received in the memory 102 as the recording start time. The camera 20b may transmit the recording start notification information including the recording start time to the moving image capturing instructing terminal 10b. After the recording start notification information is received, the control unit 103b may store the recording start time included in the recording start notification information in the memory 102.

The moving image capturing instructing terminal 10b may operate in accordance with a program. In other words, when a predetermined recording start condition is satisfied, the recording start instruction information may be transmitted to the camera 20b, and when a predetermined recording stop condition is satisfied, the recording stop instruction information may be transmitted to the camera 20b. Therefore, in a case in which the operation according to the program is performed, the input interface 104 is unnecessary.

In the third embodiment, the scheduled recording period of time and the recording period of time are displayed. Therefore, the moving image capturing instructing terminal 10b can notify the user of the information for checking the time at which the moving image is recorded. The user can check whether or not the moving image of the time intended by the user is recorded by the camera 20b on the basis of the information displayed on the monitor 101. For example, in a case in which the scheduled recording period of time and the recording period of time are significantly different, the user can understand that there is a high possibility that the moving image of the time intended by the user is not captured by the camera 20b.

Since the recording period of time is calculated on the basis of the recording start time and the scheduled recording stop time, the user can determine that a length of the moving image recorded before the scheduled recording stop time reaches a length required for the user.

Modified Example of Third Embodiment

A modified example of the third embodiment will be described. After the moving image recording information is received, the control unit 103b calculates the difference between the recording stop time and the scheduled recording stop time. The control unit 103b calculates the second recording period of time on the basis of the first recording period of time based on the moving image recording information and the difference. The control unit 103b displays the second recording period of time through the monitor 101.

Specifically, the control unit 103b performs an operation based on Formula (1).

Second recording period of time=first recording period of time−(delay time in recording stop) =first recording period of time−(recording stop time−scheduled recording stop time)     (1)

For example, the first recording period of time is a difference between the recording start time and the recording stop time. Similarly to the first embodiment, the camera 20b may transmit the recording period of time notification information including the first recording period of time to the moving image capturing instructing terminal 10b. The second recording period of time which is the difference between the recording start time and the scheduled recording stop time is calculated on the basis of Formula (1). In a case in which the recording of the moving image is stopped due to the insufficient remaining capacity of memory or the insufficient remaining capacity of the battery before the camera 20b transmits the recording stop notification information, the control unit 103b sets (the delay time in the recording stop) in Formula (1) to 0.

The second recording period of time calculated in the modified example of the third embodiment is identical to the recording period of time calculated in the third embodiment. In the calculation method according to the third embodiment, parameters to be used are smaller than in the calculation method according to the modified example of the third embodiment.

Fourth Embodiment

Figure 13:
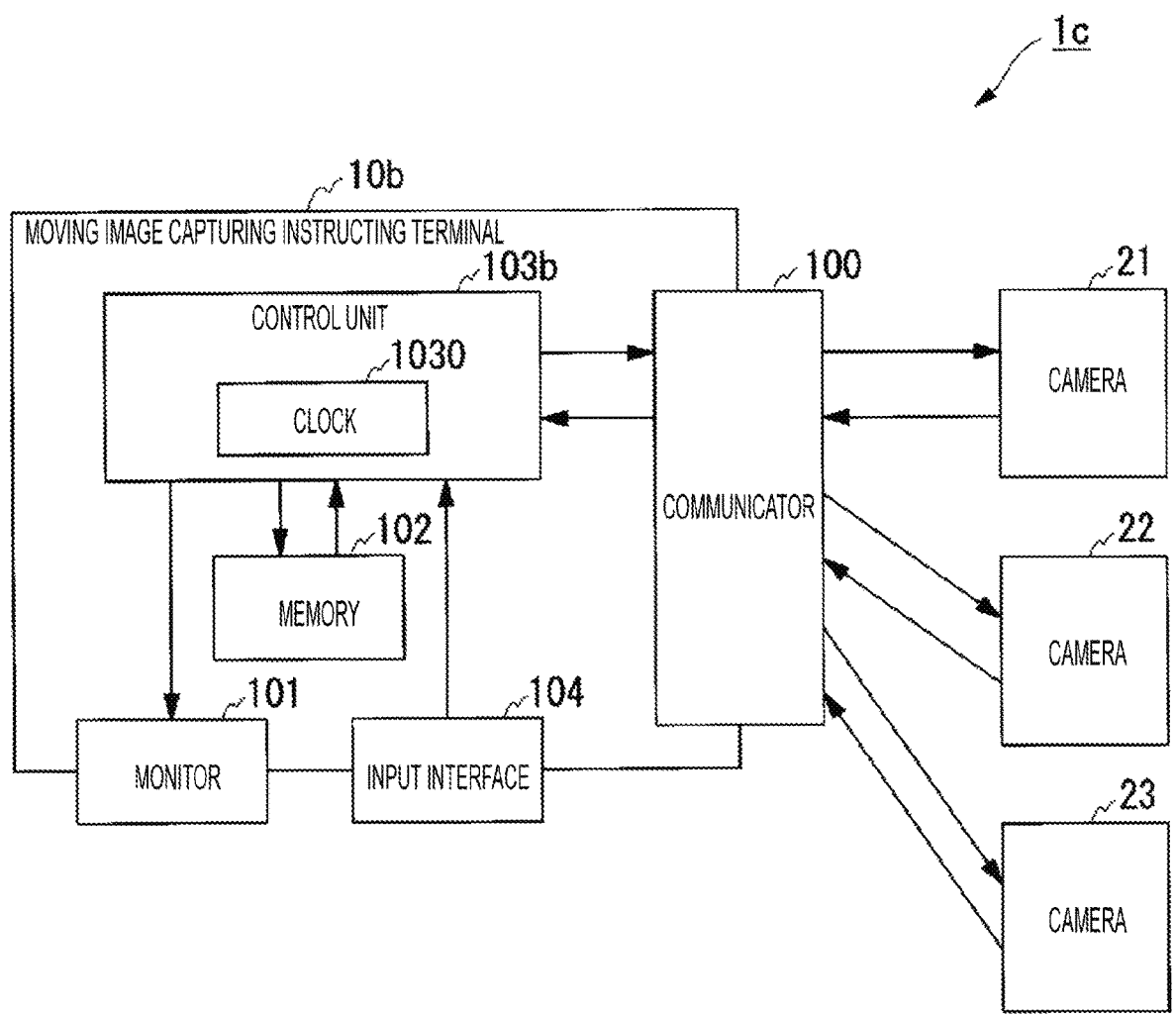
FIG. 13 is a block diagram illustrating a configuration of a moving image capturing system according to a fourth embodiment of the present invention.

FIG. 13 illustrates a configuration of a moving image capturing system 1c according to a fourth embodiment of the present invention. The moving image capturing system 1c includes a moving image capturing instructing terminal 10b, a camera 21, a camera 22, and a camera 23 as illustrated in FIG. 13. A configuration of the moving image capturing instructing terminal 10b according to the fourth embodiment is similar to that of the moving image capturing instructing terminal 10b according to the second embodiment. A configuration of each of the camera 21, the camera 22, and the camera 23 is similar to that of the camera 20b according to the second embodiment.

A panoramic video can be acquired by combining moving images recorded by a plurality of cameras. Alternatively, a moving image of a picture-in-picture (PinP) format obtained by combining a plurality of moving images having different angles of view and points of view can be generated. A three-dimensional model may be generated from the moving images recorded by a plurality of cameras. A distance measurement may be performed on the basis of the moving images recorded by a plurality of cameras.

In the fourth embodiment, timer photographing is performed. When the input interface 104 receives the recording start instruction from the user, the control unit 103b transmits the recording start instruction information to all the cameras through the communicator 100, and the memory 102 stores the scheduled recording start time. When the scheduled recording period of time elapses since the input interface 104 receives the recording start instruction from the user, the control unit 103b transmits the recording stop instruction information to all the cameras through the communicator 100.

The memory 102 stores the scheduled recording period of time. When the scheduled recording period of time elapses since the input interface 104 receives the recording start instruction from the user, the control unit 103b transmits the recording stop instruction information to the camera 21, the camera 22 and the camera 23 through the communicator 100, and the memory 102 stores the scheduled recording stop time.

The scheduled recording period of time is registered in the memory 102 in advance. The scheduled recording period of time stored in the memory 102 can be changed. The user may change the scheduled recording period of time stored in the memory 102 by operating the input interface 104.

The control unit 103b calculates the recording period of time through a method similar to that of the modified example of the third embodiment. In other words, the control unit 103b calculates the difference between the recording stop time and the scheduled recording stop time. The control unit 103b calculates the second recording period of time on the basis of the first recording period of time based on the moving image recording information and the difference.

Figure 14:
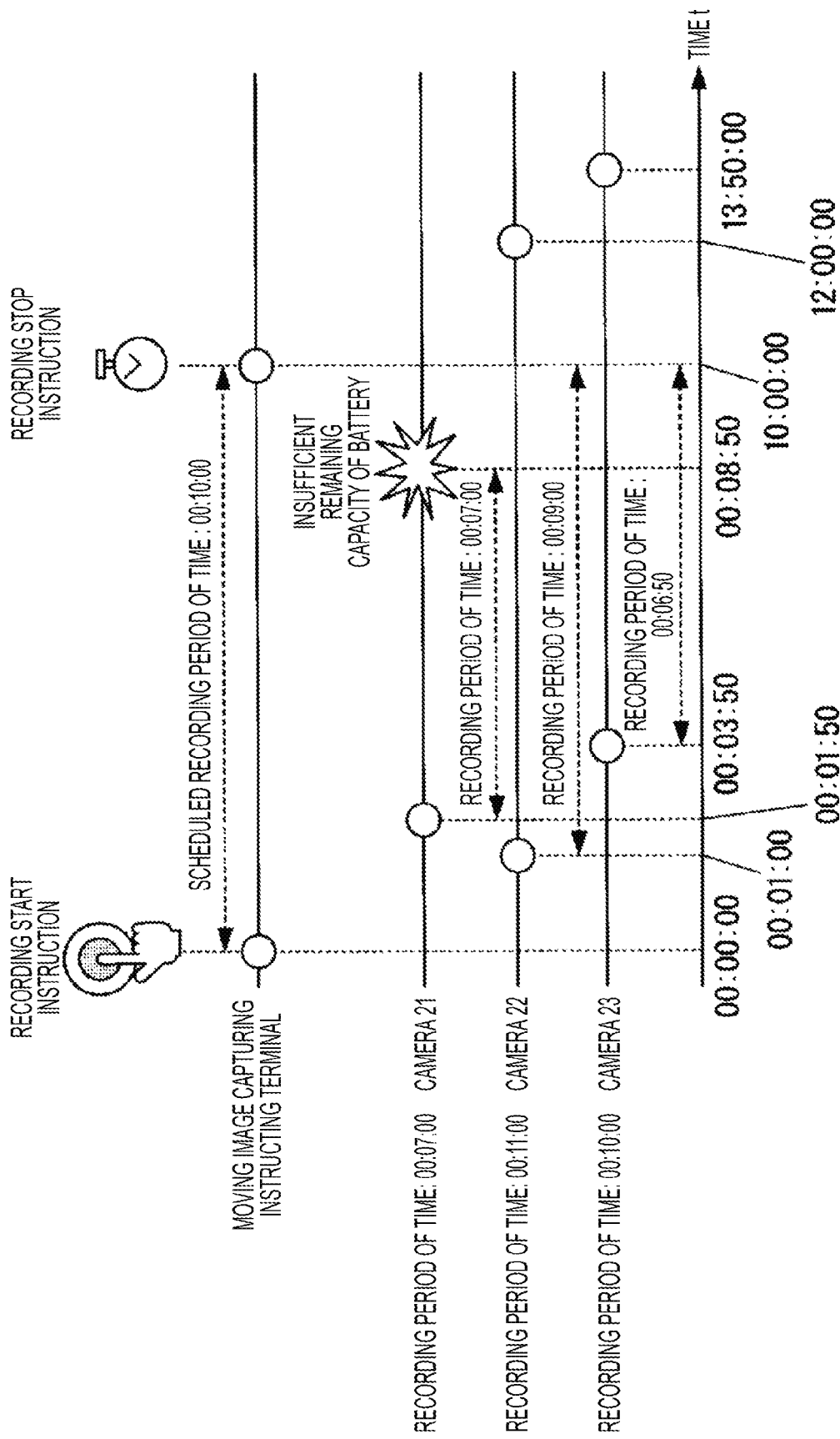
FIG. 14 is a timing chart illustrating events occurring in a moving image capturing instructing terminal and cameras according to the fourth embodiment of the present invention.

FIG. 14 illustrates events occurring in the moving image capturing instructing terminal 10b and the respective cameras. Time passes by in the right direction in FIG. 14. Schematic operations of the moving image capturing instructing terminal 10b and each camera will be described with reference to FIG. 14.

In the moving image capturing instructing terminal 10b, the input interface 104 receives the recording start instruction from the user. The scheduled recording start time is "00:00:00". The recording start instruction information is transmitted to the camera 21, the camera 22, and the camera 23 on the basis of the recording start instruction. In each camera, the communicator 200 receives the recording start instruction information. Due to the delay in the wireless communication, the time at which the moving image capturing instructing terminal 10b transmits the recording start instruction information is different from the time at which each camera receives the recording start instruction information.

In each camera, the imaging element 201 starts the capturing of the moving image on the basis of the recording start instruction information. The control unit 203b starts the recording of the moving image on the basis of the recording start instruction information. The recording start time of the camera 21 is "00:01:50". The recording start time of the camera 22 is "00:01:00". The recording start time of the camera 23 is "00:03:50". Thereafter, in the camera 21, due to the insufficient remaining capacity of the battery, the imaging element 201 stops the capturing of the moving image, and the control unit 203b stops the recording of the moving image. The recording stop time of the camera 21 is "00:08:50". For example, the control unit 203b periodically monitors the remaining capacity of the battery. When the remaining capacity of the battery is 5% or less than the capacity of the battery, the control unit 203b performs a process of stopping the capturing and the recording of the moving image.

The scheduled recording period of time elapses after the capturing and the recording of the moving image are stopped in the camera 21. Accordingly, the recording stop instruction information is transmitted to the camera 21, the camera 22, and the camera 23. The scheduled recording stop time is "10:00:00". In each camera, the communicator 200 receives the recording stop instruction information. Due to the delay in the wireless communication, the time at which the moving image capturing instructing terminal 10b transmits the recording stop instruction information is different from the time at which each camera receives the recording stop instruction information. Before the camera 21 receives the recording stop instruction information, the camera 21 stops the capturing and the recording of the moving image due to the insufficient remaining capacity of the battery.

In the camera 22 and the camera 23, the imaging element 201 stops the capturing of the moving image on the basis of the recording stop instruction information. The control unit 203b stops the recording of the moving image on the basis of the recording stop instruction information. The recording stop time of the camera 22 is "12:00:00". The recording stop time of camera 23 is "13:50:00".

The scheduled recording period of time is "00:10:00" as illustrated in FIG. 14. The scheduled recording period of time is a period of time from the scheduled recording start time to the scheduled recording stop time. The recording period of time of the camera 21 is "00:07:00" as illustrated in FIG. 14. The recording period of time of camera 22 is "00:09:00". The recording period of time of camera 23 is "00:06:50". The recording period of time is a period of time from the recording start time to the scheduled recording stop time.

Even in a case in which the difference between the scheduled recording period of time and the period of time in which the moving image is actually recorded by the camera is small, the moving image of the time intended by the user is not necessarily recorded. In the camera 23, the delay in the wireless communication is very large, and thus the start of the recording of the moving image is greatly delayed. For this reason, in the camera 23, the recording of the moving image is stopped at the time at which the scheduled recording stop time is passed significantly. The moving image recorded after the scheduled recording stop time is unnecessary for the user. In the camera 23, the time at which the moving image is actually recorded within the scheduled recording period of time period, that is, the recording period of time is shortest as compared with the times in other cameras. Therefore, there is a high possibility that the moving image of the time intended by the user is not recorded in the camera 23.

Figure 15:
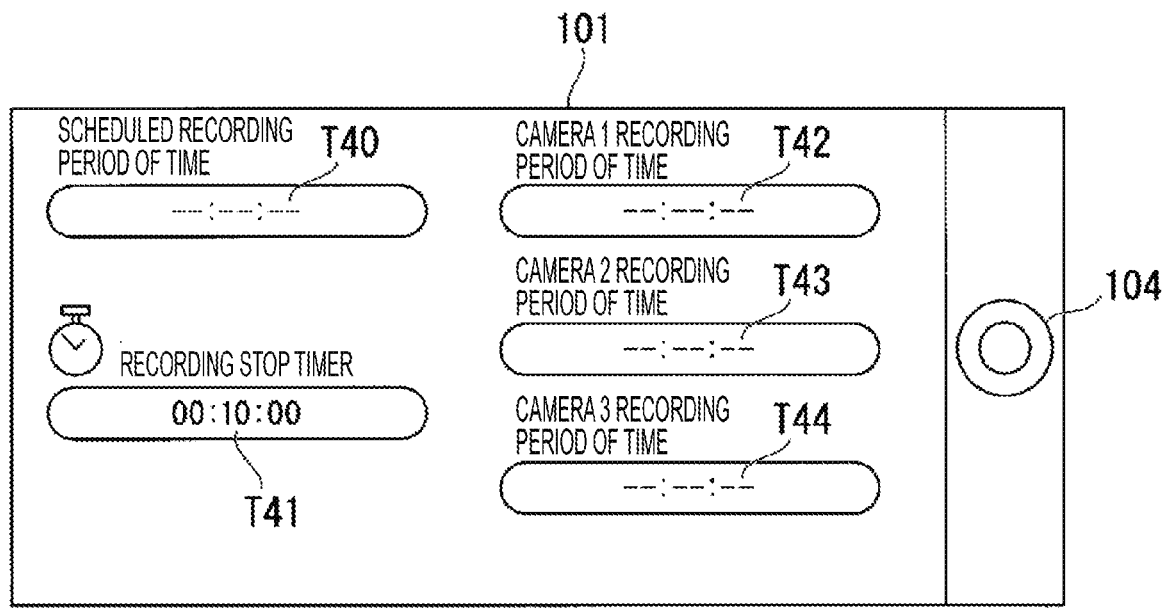
FIG. 15 is a reference diagram illustrating a screen of a monitor according to the fourth embodiment of the present invention.
Figure 16:
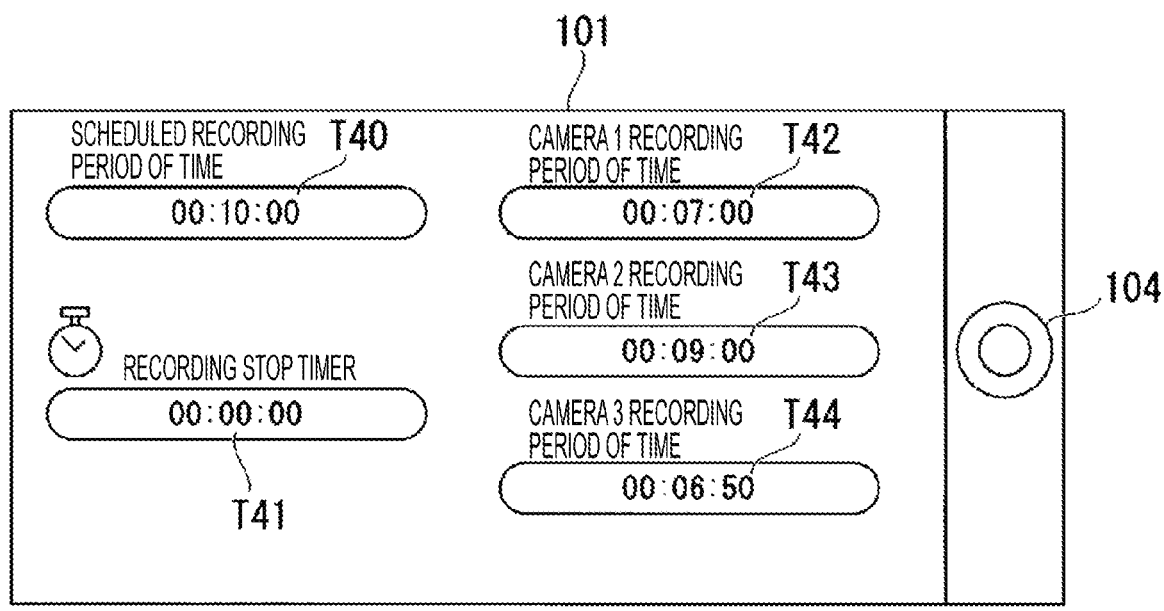
FIG. 16 is a reference diagram illustrating a screen of the monitor according to the fourth embodiment of the present invention.

FIGS. 15 and 16 illustrate a screen of the monitor 101. An example in which the monitor 101 and the input interface 104 are constituted by a touch panel is illustrated in FIGS. 15 and 16. The input interface 104 is a record button displayed on the screen of the monitor 101. The monitor 101 displays a scheduled recording period of time T40, a timer period of time T41, a recording period of time T42, a recording period of time T43, and a recording period of time T44 using letters. The timer period of time T41 is a period of time measured by the timer. The recording period of time T42 is the recording period of time of the camera 21. The recording period of time T43 is the recording period of time of the camera 22. The recording period of time T44 is the recording period of time of the camera 23.

FIG. 15 illustrates a state before the moving image is captured and recorded. Only a value of timer period of time T41 is displayed. The timer period of time T41 is "00:10:00".

FIG. 16 illustrates a state after the capturing and the recording of the moving image are stopped. The timer period of time T41 is "00:00:00", and the scheduled recording period of time is "00:10:00". Values of the recording period of time T42, the recording period of time T43, and the recording period of time T44 of the respective cameras are displayed.

Figure 17:
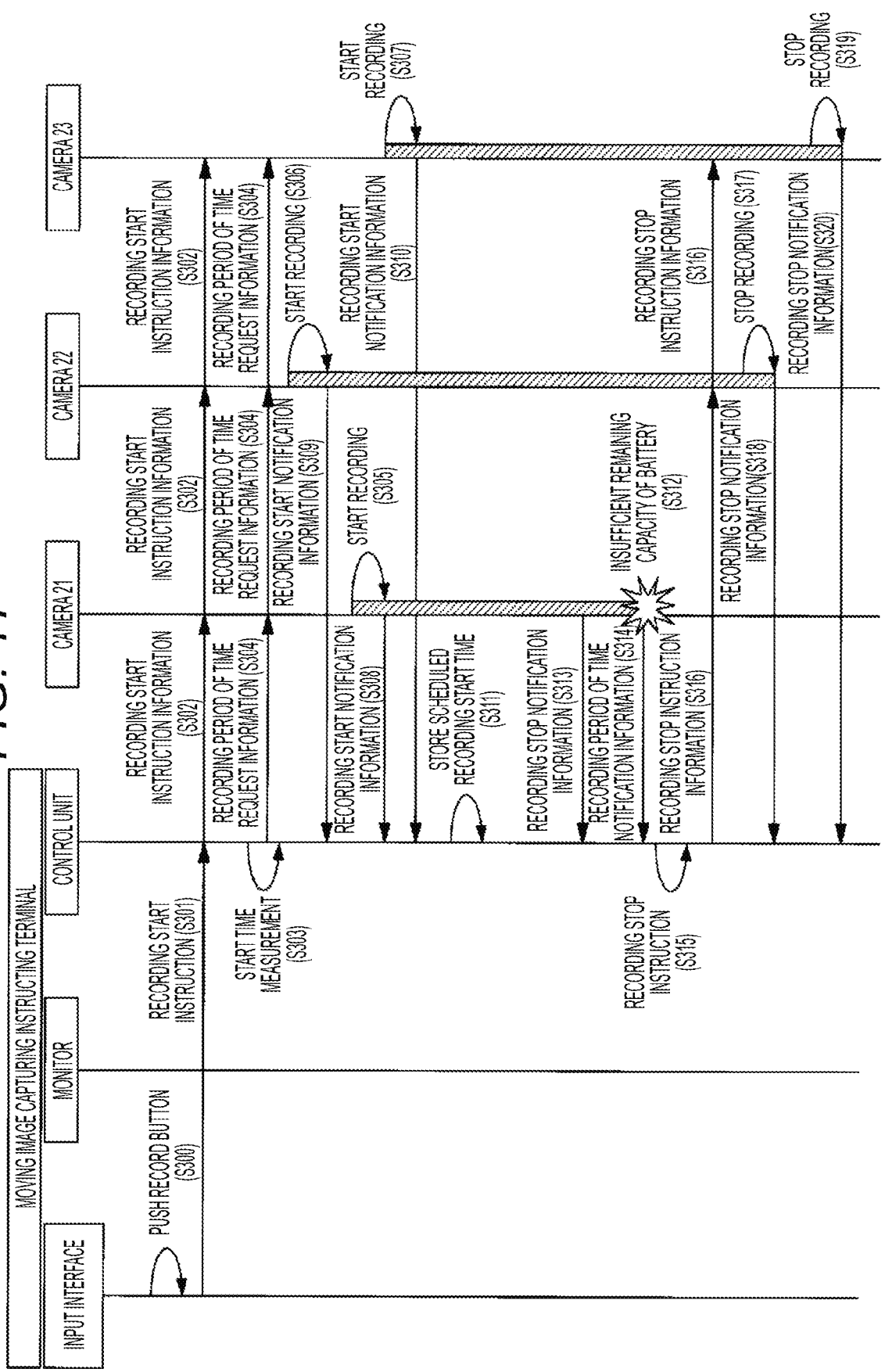
FIG. 17 is a sequence diagram illustrating a procedure of operations of the moving image capturing instructing terminal and the cameras according to the fourth embodiment of the present invention.
Figure 18:
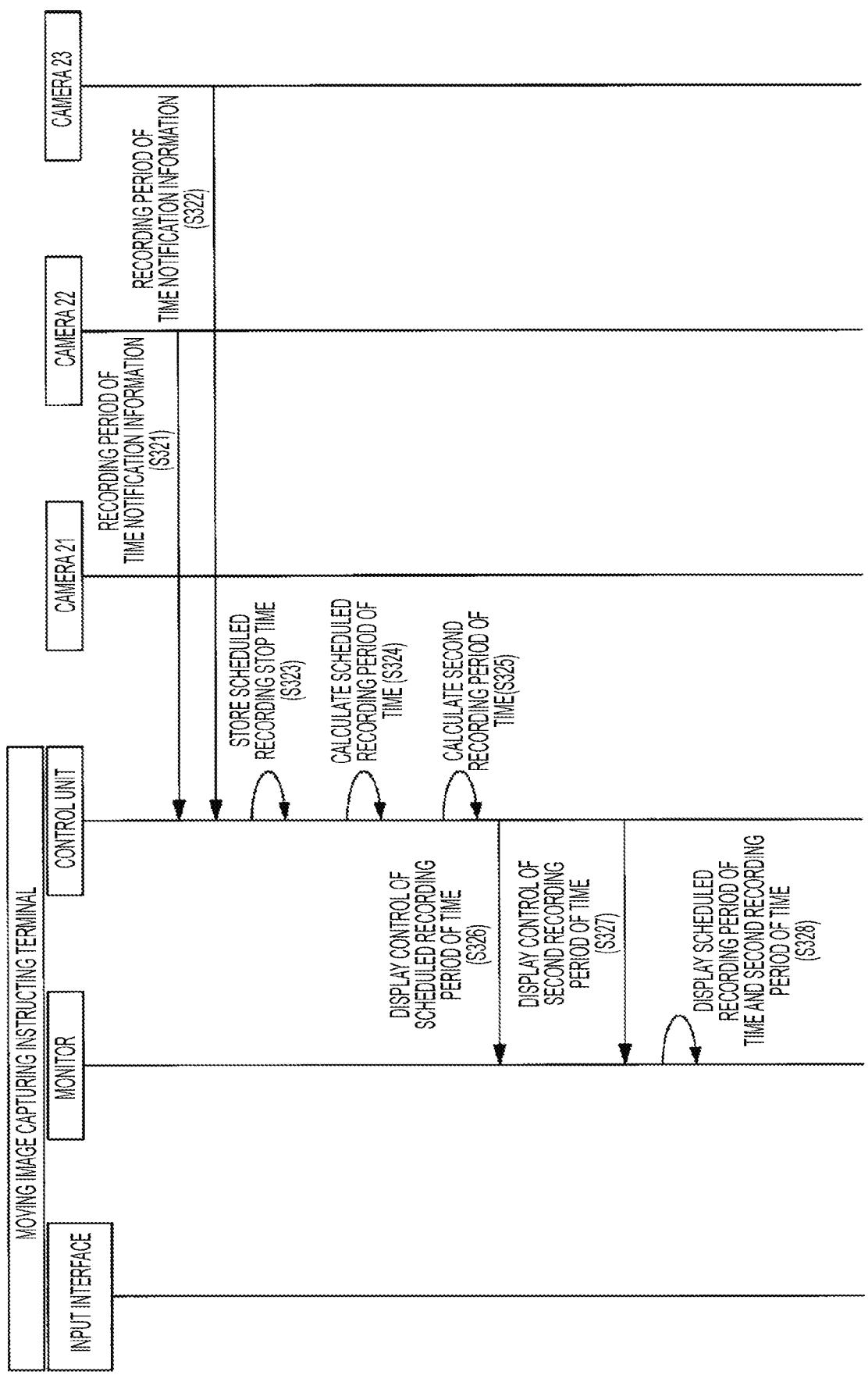
FIG. 18 is a sequence diagram illustrating a procedure of operations of the moving image capturing instructing terminal and the cameras according to the fourth embodiment of the present invention.

FIGS. 17 and 18 illustrate a procedure of operations of the moving image capturing instructing terminal 10b and the respective cameras. The operations of the moving image capturing instructing terminal 10b and each camera will be described with reference to FIGS. 17 and 18. After the operations illustrated in FIG. 17 are performed, operations illustrated in FIG. 18 are performed.

In the moving image capturing instructing terminal 10b, the input interface 104 receives the recording start instruction from the user (step S300). The input interface 104 is the record button illustrated in FIGS. 15 and 16. In step S300, when the record button is pushed down by the user, the input interface 104 receives the recording start instruction. The input interface 104 gives a notification indicating the recording start instruction received in step S300 to the control unit 103b (step S301). In step S301, the control unit 103b stores the scheduled recording start time. The scheduled recording start time is a time generated by the clock 1030 when the input interface 104 receives the recording start instruction.

After step S301, the control unit 103b generates the recording start instruction information. The control unit 103b transmits the recording start instruction information to the camera 21, the camera 22, and the camera 23 through the communicator 100. For example, the recording start instruction information is transmitted to the respective cameras in a broadcast or multicast manner. In each camera, the control unit 203b receives the recording start instruction information from the moving image capturing instructing terminal 10b through the communicator 200 (step S302).

After step S302, the control unit 103b starts the time measurement (step S303). After the time measurement is started, the control unit 103b periodically compares an elapsed time with the scheduled recording period of time and determines whether or not the scheduled recording period of time elapses.

After step S303, the control unit 103b generates the recording period of time request information. The recording period of time request information indicates an acquisition request for the recording stop time and the recording period of time to each camera. The control unit 103b transmits the recording period of time request information to the camera 21, the camera 22, and the camera 23 through the communicator 100. For example, the recording period of time request information is transmitted to each camera in a broadcast or multicast manner. In each camera, the control unit 203b receives the recording period of time request information from the moving image capturing instructing terminal 10b through the communicator 200 (step S304).

As described above, the camera 21 stops the capturing and the recording of the moving image due to the insufficient remaining capacity of the battery. In a case in which the recording period of time request information is transmitted on the basis of the recording stop instruction from the user, the camera 21 is unable to receive the recording period of time request information. Accordingly, the moving image capturing instructing terminal 10b is unable to acquire the recording stop time and the recording period of time from the camera 21. As described above, when the input interface 104 receives the recording start instruction from the user, the control unit 103b transmits the recording period of time request information to the camera 21, the camera 22, and the camera 23 through the communicator 100. Therefore, the camera 21 can receive the recording period of time request information. As will be described later, when the camera 21 stops the capturing and the recording of the moving image, the camera 21 gives a notification indicating the recording stop time and the recording period of time to the moving image capturing instructing terminal 10b.

In the camera 21, the control unit 203b starts the capturing and the recording of the moving image on the basis of the recording start instruction information. In other words, the control unit 203b starts the capturing of the moving image by the imaging element 201 and starts the recording of the moving image captured by the imaging element 201 in the memory 202 (step S305). In step S305, the control unit 203b stores the recording start time in the memory 202. The recording start time is a time generated by the clock 2030 when the control unit 203b starts the recording of the moving image. In other words, the recording start time is a time at which the recording of the moving image is started. The recording start time may be a time at which the recording start instruction information is received or a time at which the recording start notification information is transmitted. Similarly, the camera 22 starts the capturing and the recording of the moving image (step S306). Similarly, the camera 23 starts the capturing and the recording of the moving image (step S307).

After step S305, in the camera 21, the control unit 203b generates the recording start notification information. The control unit 203b transmits the recording start notification information to the moving image capturing instructing terminal 10b through the communicator 200. In the moving image capturing instructing terminal 10b, the control unit 103b receives the recording start notification information from the camera 21 through the communicator 100 (step S308). Similarly, the camera 22 transmits the recording start notification information to the moving image capturing instructing terminal 10b, and the moving image capturing instructing terminal 10b receives the recording start notification information from the camera 22 (step S309). Similarly, the camera 23 transmits the recording start notification information to the moving image capturing instructing terminal 10b, and the moving image capturing instructing terminal 10b receives the recording start notification information from the camera 23 (step S310).

After the recording start notification information is received from all the cameras, the control unit 103b in the moving image capturing instructing terminal 10b stores the scheduled recording start time in the memory 102 (step S311). The scheduled recording start time may be a time at which the recording start instruction information is transmitted.

The capturing and the recording of the moving image are forcibly stopped due to the insufficient remaining capacity of the battery after the capturing and the recording of the moving image are started in the camera 21. In other words, the control unit 203b stops the capturing of the moving image by the imaging element 201 and stops the recording of the moving image captured by the imaging element 201 in the memory 202 (step S312). In step S312, the control unit 203b stores the recording stop time in the memory 202. The recording stop time is a time generated by the clock 2030 when the control unit 203b stops the recording of the moving image. In other words, the recording stop time is a time at which the recording of the moving image is stopped.

After step S312, in the camera 21, the control unit 203b generates the recording stop notification information. The control unit 203b transmits the recording stop notification information to the moving image capturing instructing terminal 10b through the communicator 200. In the moving image capturing instructing terminal 10b, the control unit 103b receives the recording stop notification information from the camera 21 through the communicator 100 (step S313). If the recording stop notification information is received from the camera 21 before the scheduled recording period of time elapses from the scheduled recording start time, the control unit 103b detects an abnormal stop of the capturing and the recording of the moving image in the camera 21.

After step S313, in the camera 21, the control unit 203b reads the recording start time and the recording stop time from the memory 202 on the basis of the recording period of time request information received in step S304. The control unit 203b calculates the recording period of time by calculating the difference between the recording start time and the recording stop time which are read out. The control unit 203b generates the recording period of time notification information. The recording period of time notification information includes the calculated recording period of time and the recording stop time. The recording period of time notification information corresponds to the moving image recording information. The control unit 203b transmits the recording period of time notification information to the moving image capturing instructing terminal 10b through the communicator 200. In the moving image capturing instructing terminal 10b, the control unit 103b receives the recording period of time notification information from the camera 21 through the communicator 100 (step S314). In step S314, the control unit 103b stores the recording period of time and the recording stop time included in the received recording period of time notification information in the memory 102.

After the capturing and the recording of the moving image are stopped in the camera 21, the control unit 103b in the moving image capturing instructing terminal 10b detects that the scheduled recording period of time elapses from the scheduled recording start time. Accordingly, the control unit 103b detects the occurrence of the recording stop instruction (step S315). In step S315, the control unit 103b stores the scheduled recording stop time. The scheduled recording stop time is a time generated by the clock 1030 when the scheduled recording period of time elapses from the scheduled recording start time.

After step S315, the control unit 103b generates the recording stop instruction information. The destination of the recording stop instruction information is the camera 22 and the camera 23 excluding the camera 21 in which the abnormal stop of the capturing and the recording of the moving image is detected. The control unit 103b transmits the recording stop instruction information to the camera 22 and the camera 23 through the communicator 100. In each camera, the control unit 203b receives the recording stop instruction information from the moving image capturing instructing terminal 10b through the communicator 200 (step S316).

In the camera 22, the control unit 203b stops the capturing and the recording of the moving image on the basis of the recording stop instruction information received in step S316. In other words, the control unit 203b stops the capturing of the moving image by the imaging element 201 and stops the recording of the moving image captured by the imaging element 201 in the memory 202 (step S317). In step S317, the control unit 203b stores the recording stop time in the memory 202.

After step S317, in the camera 22, the control unit 203b generates the recording stop notification information. The control unit 203b transmits the recording stop notification information to the moving image capturing instructing terminal 10b through the communicator 200. In the moving image capturing instructing terminal 10b, the control unit 103b receives the recording stop notification information from the camera 22 through the communicator 100 (step S318).

Similarly, the camera 23 stops the capturing and the recording of the moving image (step S319). Similarly, the camera 23 transmits the recording stop notification information to the moving image capturing instructing terminal 10b, and the moving image capturing instructing terminal 10b receives the recording stop notification information from the camera 23 (step S320).

After step S318, in the camera 22, the control unit 203b reads the recording start time and the recording stop time from the memory 202 on the basis of the recording period of time request information received in step S304. The control unit 203b calculates the recording period of time by calculating the difference between the recording start time and the recording stop time which are read out. The control unit 203b generates the recording period of time notification information. The recording period of time notification information includes the calculated recording period of time and the recording stop time. The recording period of time notification information corresponds to the moving image recording information. The control unit 203b transmits the recording period of time notification information to the moving image capturing instructing terminal 10b through the communicator 200. In the moving image capturing instructing terminal 10b, the control unit 103b receives the recording period of time notification information from the camera 22 through the communicator 100 (step S321). In step S321, the control unit 103b stores the recording period of time and the recording stop time included in the received recording period of time notification information in the memory 102. Similarly, the camera 23 transmits the recording period of time notification information to the moving image capturing instructing terminal 10b, and the moving image capturing instructing terminal 10b receives the recording period of time notification information from the camera 23 (step S322).

After the recording period of time notification information is received from the camera 22 and the camera 23, the control unit 103b stores the scheduled recording stop time in the memory 102 (step S323). The scheduled recording stop time may be a time at which the recording stop instruction information is transmitted.

After step S323, the control unit 103b reads the scheduled recording start time and the scheduled recording stop time from the memory 102. The control unit 103b calculates the scheduled recording period of time by calculating the difference between the scheduled recording start time and the scheduled recording stop time which are read out (step S324). In step S324, the control unit 103b stores the calculated scheduled recording period of time in the memory 102.

After step S324, the control unit 103b reads the recording period of time, the recording stop time, and the scheduled recording stop time from the memory 102. The control unit 103b performs an operation based on Formula (1) described in the third embodiment. In other words, the control unit 103b calculates the difference between the recording stop time and the scheduled recording stop time. The control unit 103b calculates the second recording period of time on the basis of the recording period of time read from the memory 102, that is, the first recording period of time and the difference (step S325). In step S325, the control unit 103b stores the calculated second recording period of time in the memory 102. Before the process of step S324 is performed, the process of step S325 may be performed.

After step S325, the control unit 103b performs display control such that the scheduled recording period of time is displayed on the monitor 101 (step S326). In step S326, the control unit 103b reads the scheduled recording period of time from the memory 102 and performs display control on the basis of the read scheduled recording period of time. After step S326, the control unit 103b performs display control such that the second recording period of time is displayed on the monitor 101 (step S327). In step S327, the control unit 103b reads the second recording period of time from the memory 102 and performs display control on the basis of the read second recording period of time. The monitor 101 displays the scheduled recording period of time and the second recording period of time (step S328).

The moving image capturing instructing terminal 10b may operate in accordance with a program. In other words, when a predetermined recording start condition is satisfied, the recording start instruction information may be transmitted to the camera 21, the camera 22, and the camera 23. Therefore, when the operation according to the program is performed, the input interface 104 is unnecessary.

Instead of the scheduled recording period of time, the scheduled recording start time and the scheduled recording stop time may be displayed. Instead of the second recording period of time, the first recording period of time may be displayed. Instead of the second recording period of time, the recording start time and the recording stop time may be displayed.

The timing chart illustrated in FIG. 14 may be displayed. In this case, the user can easily understand information related to the recording periods of time of a plurality of cameras.

In the second and third embodiments, timer photographing may be performed. In other words, when the input interface 104 receives the recording start instruction from the user, the control unit 103b may transmit the recording start instruction information to the camera 20b through the communicator 100, and the memory 102 may store the scheduled recording start time. When the scheduled recording period of time elapses after the input interface 104 received the recording start instruction from the user, the control unit 103b may transmit the recording stop instruction information to the camera 20b through the communicator 100.

The moving image capturing instruction method according to the fourth embodiment includes step S302 (first step), steps S314, S321, and S322 (second step), steps S326 and S328 (third step), and step S327 and S328 (fourth step). The moving image capturing instruction method of each aspect of the present invention may not have steps other than step corresponding to the first to fourth steps.

In simultaneous capturing of moving images by a plurality of cameras, there are cases in which a time at which the capturing starts in each camera differs in units of seconds, depending on wireless communication environments. Therefore, there is a possibility that the moving image of the timing or the time intended by the user is not recorded by the camera.

In the fourth embodiment, the scheduled recording period of time and the second recording period of time are displayed. Therefore, the moving image capturing instructing terminal 10b can notify the user of the information for checking the time at which the moving image is recorded. The user can check whether or not the moving image of the time intended by the user is recorded by the camera 21, the camera 22, and the camera 23 on the basis of the information displayed on the monitor 101. For example, in a case in which the scheduled recording period of time is significantly different from the second recording period of time, the user can understand that there is a high possibility that the moving image of the time intended by the user is not captured by the camera.

In the fourth embodiment, the recording periods of time of a plurality of cameras are displayed. Therefore, the user can check a period in which a plurality of cameras perform the capturing and the recording of the moving image simultaneously.

First Modified Example of Fourth Embodiment

A camera communicating with the moving image capturing instructing terminal 10b is each of a plurality of cameras (the cameras 21, 22, and 23). After the moving image recording information is received from a plurality of cameras, the control unit 103b calculates the recording period of time included in the period of time between the scheduled recording start time and the scheduled recording stop time on the basis of the moving image recording information for each of a plurality of cameras. The control unit 103b displays camera information of only a camera having the shortest recording period of time among a plurality of cameras through the monitor 101. The camera information includes at least one of the recording period of time and the combination of the recording start time and the recording stop time.

As described above, the period of time in which the moving image is actually recorded within the period of the scheduled recording period of time is important. Therefore, the control unit 103b calculates the period of time between the scheduled recording start time and the scheduled recording stop time which is the period of time included in the recording period of time in each camera. For example, the control unit 103b calculates the recording period of time on the basis of the recording start time and the scheduled recording stop time.

Figure 19:
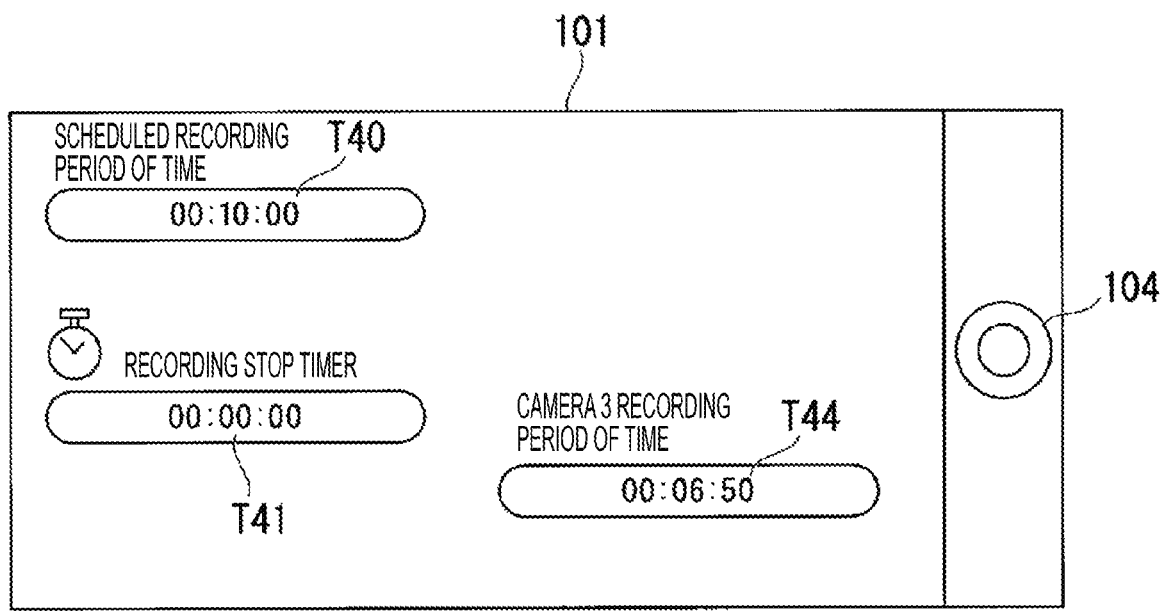
FIG. 19 is a reference diagram illustrating a screen of a monitor according to a first modified example of the fourth embodiment of the present invention.

FIG. 19 illustrates a screen of the monitor 101. FIG. 19 will be described focusing on points different from FIG. 16. The monitor 101 displays a scheduled recording period of time T40, a timer period of time T41, and a recording period of time T44 using letters. The recording period of time T44 of the camera 23 having the shortest recording period of time among the camera 21, the camera 22 and the camera 23 is displayed, and the recording periods of time of the camera 21 and the camera 22 are not displayed.

Instead of the recording period of time of the camera having the shortest recording period of time among a plurality of cameras, the recording start time and the recording stop time of the camera may be displayed. In this case, the scheduled recording start time and the scheduled recording stop time may be displayed instead of the scheduled recording period of time. The recording period of time in each camera may be a time based on the recording start time and the recording stop time.

In the first modified example of the fourth embodiment, information of only the camera having the shortest recording period of time among a plurality of cameras is displayed. Therefore, the user can reliably check information of a notable camera among a plurality of cameras.

Second Modified Example of Fourth Embodiment

The camera communicating with the moving image capturing instructing terminal 10b is each of a plurality of cameras (the cameras 21, 22, and 23). After the moving image recording information is received from a plurality of cameras, the control unit 103b calculates the recording period of time included in the period of time between the recording start instruction time and the recording stop instruction time on the basis of the moving image recording information for each of a plurality of cameras. The control unit 103b displays first information to be emphasized more than second information through the monitor 101. The first information is camera information of a camera having the shortest recording period of time among a plurality of cameras. The second information is camera information of cameras excluding the camera having the shortest recording period of time among a plurality of cameras. The camera information includes at least one of the recording period of time and the combination of the recording start time and the recording stop time.

Similarly to the first modified example of the fourth embodiment, the control unit 103b calculates the period of time between the scheduled recording start time and the scheduled recording stop time which is the period of time included in the recording period of time in each camera. For example, the control unit 103b calculates the recording period of time on the basis of the recording start time and the scheduled recording stop time.

Figure 20:
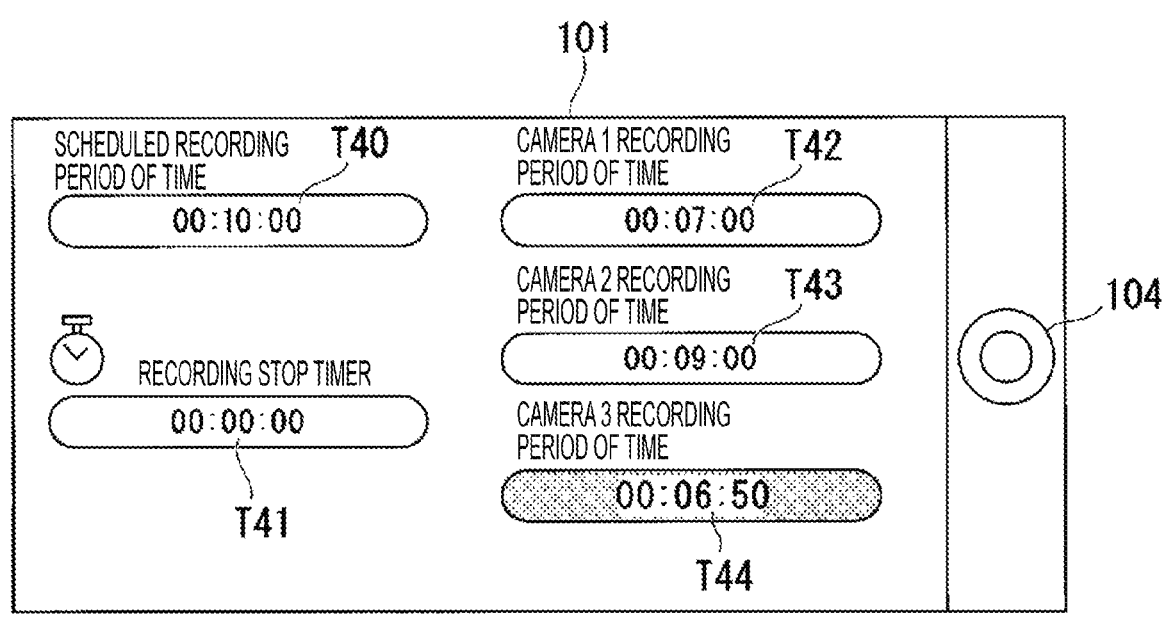
FIG. 20 is a reference diagram illustrating a screen of a monitor according to a second modified example of the fourth embodiment of the present invention.

FIG. 20 illustrates a screen of the monitor 101. FIG. 20 will be described focusing on points different from FIG. 16. A display form of a recording period of time T44 of the camera 23 having the shortest recording period of time among the camera 21, the camera 22, and the camera 23 is different from a display form of a recording period of time T42 of the camera 21 and a recording period of time T43 of the camera 22. The recording period of time T44 of the camera 23 is emphasized more than the recording period of time T42 of the camera 21 and the recording period of time T43 of the camera 22. For example, the recording period of time T44 is displayed larger than the recording period of time T42 and the recording period of time T43. The recording period of time T44 is displayed with thicker characters than the recording period of time T42 and the recording period of time T43. A color of a region in which the recording period of time T44 is displayed is different from colors of regions in which the recording period of time T42 and the recording period of time T43 are displayed. At least one of the above-mentioned emphasis methods is selected. The method of emphasizing the recording period of time of the camera with the shortest recording period of time may be a method other than the methods described above.

Instead of the recording period of time of the camera having the shortest recording period of time among a plurality of cameras, the recording start time and the recording stop time of the camera may be displayed. In this case, the scheduled recording start time and the scheduled recording stop time may be displayed instead of the scheduled recording period of time. The recording period of time in each camera may be a time based on the recording start time and the recording stop time.

In the second modified example of the fourth embodiment, the information of the camera having the shortest recording period of time among a plurality of cameras is displayed to be emphasized more than the information of the other cameras. Therefore, the user can reliably check the information of the notable camera among a plurality of cameras.

Fifth Embodiment

A fifth embodiment of the present invention will be described using the moving image capturing system 1c according to the fourth embodiment of the present invention.

Figure 21:
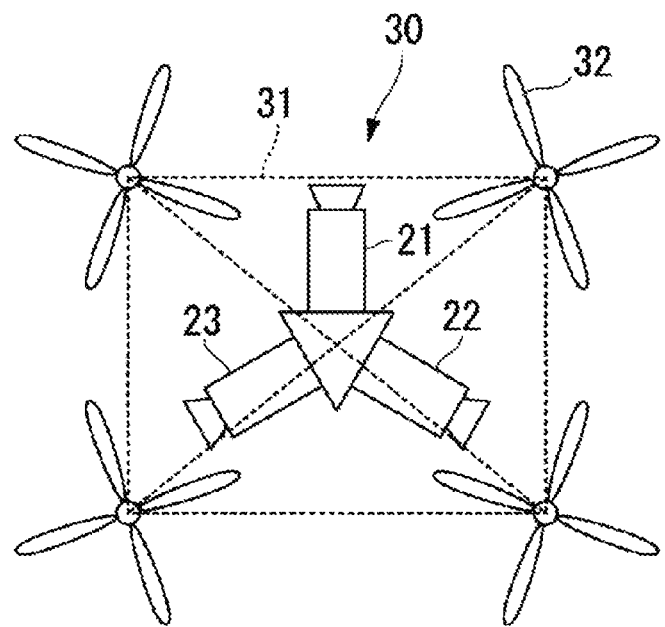
FIG. 21 is an external view of an autonomous airplane according to a fifth embodiment of the present invention.

In the fifth embodiment, the camera 21, the camera 22, and the camera 23 are installed in an autonomous airplane 30 illustrated in FIG. 21. The autonomous airplane 30 includes a frame 31 and four propellers 32 installed in the frame 31 as illustrated in FIG. 21. The autonomous airplane 30 can fly through the air. The camera 21, the camera 22, and the camera 23 are installed in a central part of the autonomous airplane 30. A difference in an imaging direction between the cameras is 120°. For example, an angle of view of a lens of each camera is 180°.

The moving image capturing instructing terminal 10*b* is installed in the autonomous airplane 30. Alternatively, the moving image capturing instructing terminal 10*b* may not be installed in the autonomous airplane 30. The following description will proceed with an example in which the moving image capturing instructing terminal 10*b* is installed in the autonomous airplane 30. The moving image capturing instructing terminal 10*b* operates according to a program. In other words, when a predetermined recording start condition is satisfied, the recording start instruction information is transmitted to the camera 21, the camera 22, and the camera 23, and when a predetermined recording stop condition is satisfied, the recording stop instruction information is transmitted to the camera 21, the camera 22, and the camera 23.

For example, the moving image capturing instructing terminal 10*b* includes a GPS sensor. The memory 102 stores the recording start position as a recording start condition and stores the recording stop position as a recording stop condition. The recording start position and the recording stop position are registered in the memory 102 in advance. The recording start position and the recording stop position stored in the memory 102 can be changed. The user may change the recording start position and the recording stop position stored in the memory 102 by manipulating the input interface 104. When the position of the moving image capturing instructing terminal 10*b* is the recording start position, the control unit 103*b* transmits the recording start instruction information to the camera 21, the camera 22, and the camera 23 through the communicator 100. When the position of the moving image capturing instructing terminal 10*b* is the recording stop position, the control unit 103*b* transmits the recording stop instruction information to the camera 21, the camera 22, and the camera 23 through the communicator 100.

Figure 22:
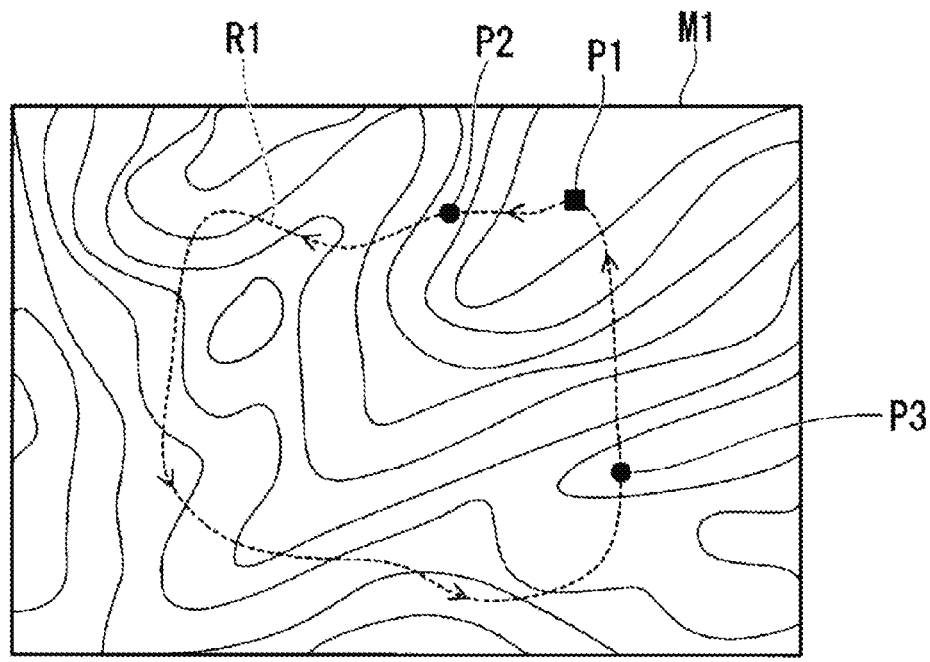
FIG. 22 is a map illustrating a flight path of the autonomous airplane according to the fifth embodiment of the present invention.

FIG. 22 is a map M1 illustrating a flight path R1 of the autonomous airplane 30. The autonomous airplane 30 takes off at a position P1. The autonomous airplane 30 passes through a position P2 and a position P3 in the flight path R1. The autonomous airplane 30 flies along the flight path R1 and then lands at the position P1. The position P2 in the flight path R1 is the recording start position. When the autonomous airplane 30 reaches the position P2, the moving image capturing instructing terminal 10*b* transmits the recording start instruction information to the camera 21, the camera 22, and the camera 23. The position P3 in the flight path R1 is the recording stop position. When the autonomous airplane 30 reaches the position P3, the moving image capturing instructing terminal 10*b* transmits the recording stop instruction information to the camera 21, the camera 22, and the camera 23.

The control unit 103*b* calculates the recording period of time through a method similar to that in the third embodiment. In other words, the control unit 103*b* calculates the recording period of time on the basis of the recording start time and the scheduled recording stop time.

A camera communicating with the moving image capturing instructing terminal 10*b* is each of a plurality of cameras (the cameras 21, 22, and 23). After the moving image recording information is received from a plurality of cameras, the control unit 103*b* calculates the recording period of time included in the period of time between the recording start instruction time and the recording stop instruction time on the basis of the moving image recording information for each of a plurality of cameras. After the moving image recording information is received from a plurality of cameras, the control unit 103*b* transmits the image transmission instruction information to the camera having the shortest recording period of time among a plurality of cameras through the communicator 100. The image transmission instruction information indicates an instruction to transmit at least one of a plurality of frame images constituting a moving image. The control unit 103*b* receives one or more frame images from the camera which has received the image transmission instruction information through the communicator 100. The control unit 103*b* displays the received frame image through the monitor 101.

In one of a plurality of cameras, the control unit 203*b* receives the image transmission instruction information from the moving image capturing instructing terminal 10*b* through the communicator 200. The control unit 203*b* reads one or more frame images from the memory 202 on the basis of the image transmission instruction information. The control unit 203*b* transmits one or more read frame images to the moving image capturing instructing terminal 10*b* through the communicator 200.

The frame images acquired by the moving image capturing instructing terminal 10*b* are some of a plurality of frame images recorded by the camera having the shortest recording period of time. For example, the control unit 103*b* receives only one frame image from the camera which has received the image transmission instruction information through the communicator 100. The control unit 103*b* displays only one received frame image through the monitor 101. The control unit 103*b* may receive two or more frame images from the camera which has received the image transmission instruction information through the communicator 100. The control unit 103*b* may display the two or more received frame images simultaneously or sequentially through the monitor 101. In the following example, the moving image capturing instructing terminal 10*b* is assumed to acquire two frame images corresponding to the recording start time and the recording stop time. The moving image capturing instructing terminal 10*b* may acquire a frame image corresponding to any one of the recording start time and the recording stop time.

In a case in which the wireless communication between the moving image capturing instructing terminal 10*b* and each camera is disconnected, each camera may continue to capture and record the moving image. In a case in which the wireless communication between the moving image capturing instructing terminal 10*b* and each camera is disconnected, the moving image capturing instructing terminal 10*b* may establish a connection with each camera again and transmit the recording stop instruction information to each camera. Alternatively, in a case in which the wireless communication between the moving image capturing instructing terminal 10*b* and each camera is disconnected, the user may give an instruction to stop the capturing and the recording of the moving image to each camera by pushing the record button installed in each camera.

Figure 23:
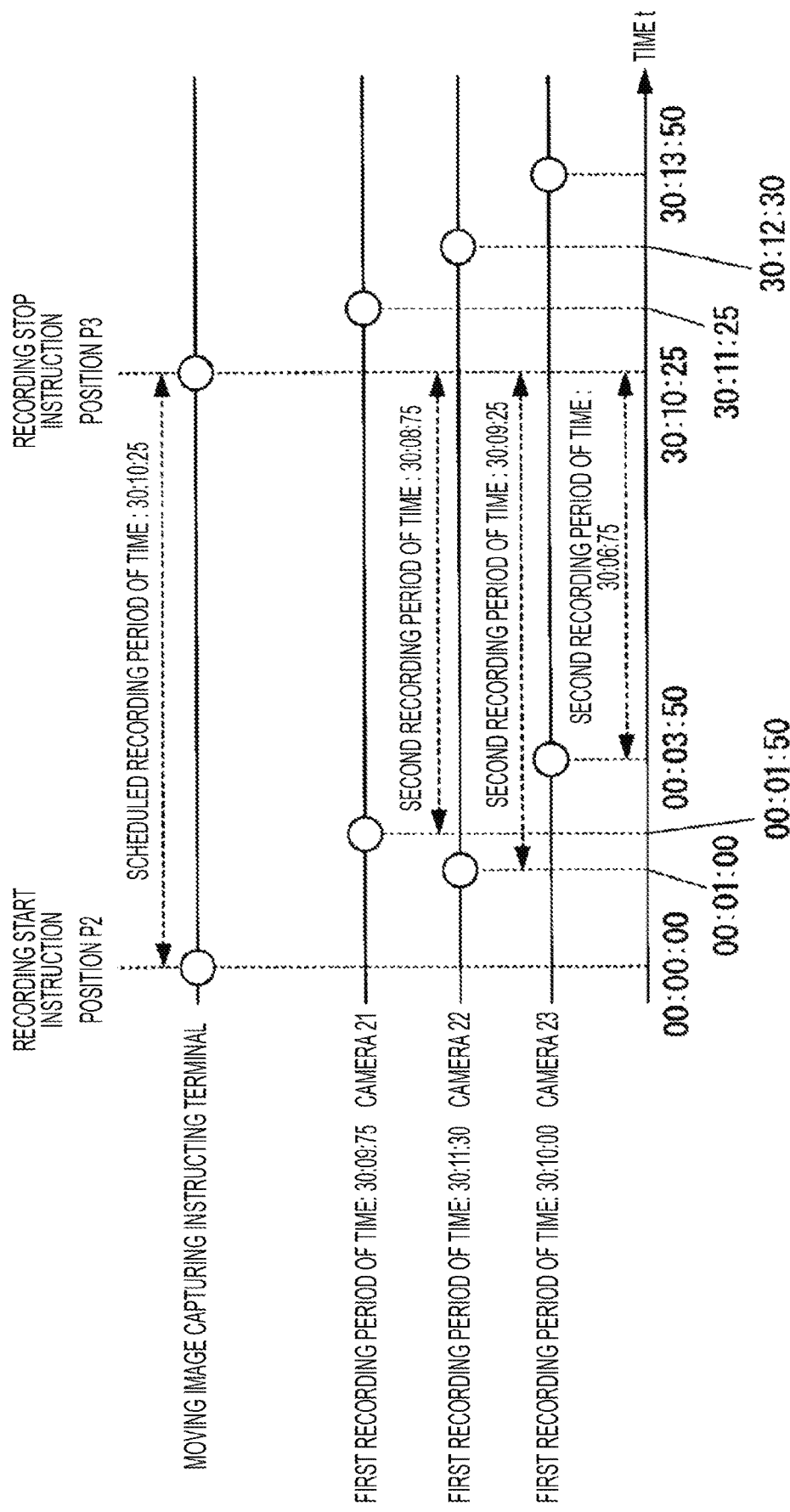
FIG. 23 is a timing chart illustrating events occurring in a moving image capturing instructing terminal and a camera according to the fifth embodiment of the present invention.

FIG. 23 illustrates events occurring in the moving image capturing instructing terminal 10*b* and the respective cameras. Time passes by in the right direction in FIG. 23.

Schematic operations of the moving image capturing instructing terminal 10*b* and each camera will be described with reference to FIG. 23.

The moving image capturing instructing terminal 10*b* reaches the position P2 which is the recording start position. The scheduled recording start time is "00:00:00". The recording start instruction information is transmitted to the camera 21, the camera 22, and the camera 23. In each camera, the communicator 200 receives the recording start instruction information. Due to the delay in the wireless communication, the time at which the moving image capturing instructing terminal 10*b* transmits the recording start instruction information is different from the time at which each camera receives the recording start instruction information.

In each camera, the imaging element 201 starts the capturing of the moving image on the basis of the recording start instruction information. The control unit 203*b* starts the recording of the moving image on the basis of the recording start instruction information. The recording start time of the camera 21 is "00:01:50". The recording start time of the camera 22 is "00:01:00". The recording start time of the camera 23 is "00:03:50".

The moving image capturing instructing terminal 10*b* reaches the position P3 which is the recording stop position. The recording stop instruction information is transmitted to the camera 21, the camera 22, and the camera 23. The scheduled recording stop time is "30:10:25". In each camera, the communicator 200 receives the recording stop instruction information. Due to the delay in the wireless communication, the time at which the moving image capturing instructing terminal 10*b* includes transmitted the recording stop instruction information is different from the time at which each camera received the recording stop instruction information.

In each camera 23, the imaging element 201 stops the capturing of the moving image on the basis of the recording stop instruction information. The control unit 203*b* stops the recording of the moving image on the basis of the recording stop instruction information. The recording stop time of the camera 21 is "30:11:25". The recording stop time of the camera 22 is "30:12:30". The recording stop time of the camera 23 is "30:13:50".

The scheduled recording period of time is "30:10:25" as illustrated in FIG. 23. The scheduled recording period of time is a period of time from the scheduled recording start time to the scheduled recording stop time. A first recording period of time of the camera 21 is "30:09:75", and a second recording period of time of the camera 21 is "30:08:75" as illustrated in FIG. 23. A first recording period of time of the camera 22 is "30:11:30", and a second recording period of time of the camera 22 is "30:09:25". A first recording period of time of the camera 23 is "30:10:00" and a second recording period of time of the camera 23 is "30:06:75". The first recording period of time is a period of time from the recording start time to the recording stop time. The second recording period of time is a period of time from the recording start time to the scheduled recording stop time.

Figure 24:
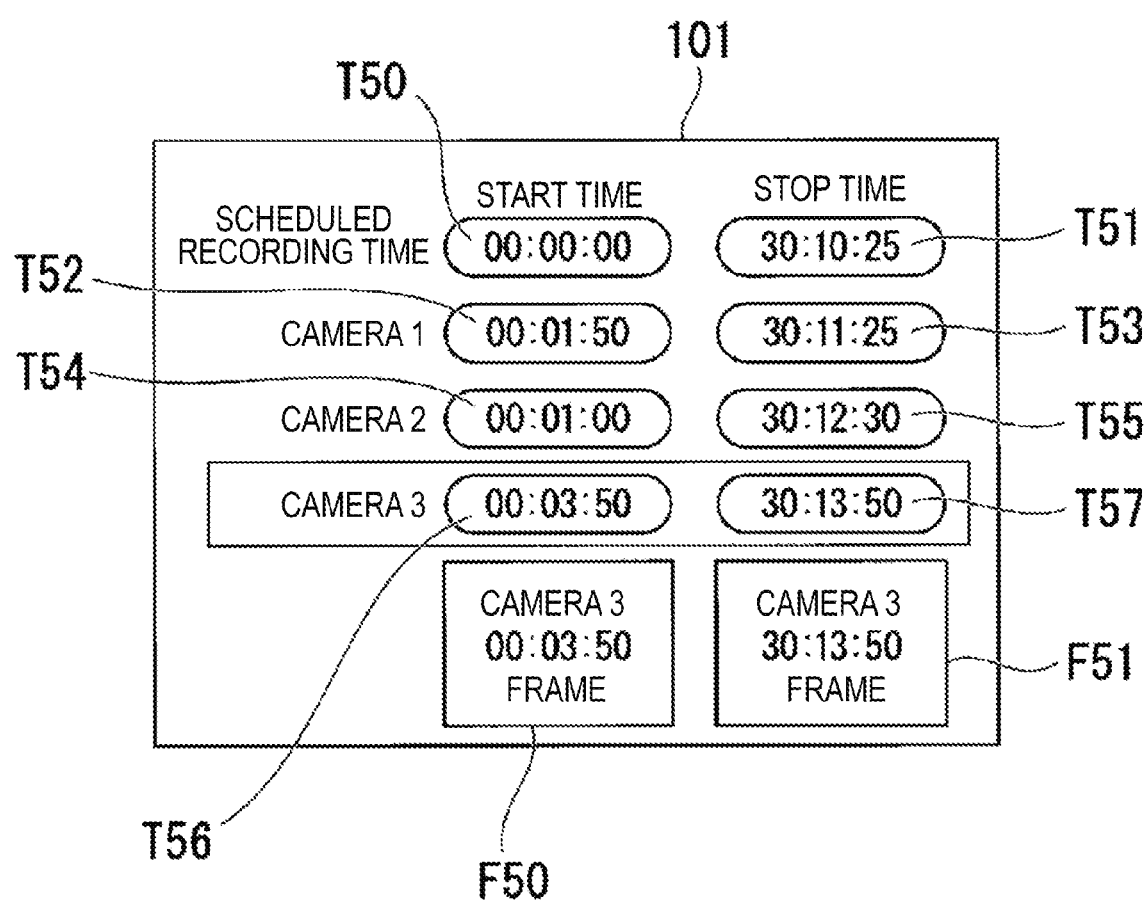
FIG. 24 is a reference diagram illustrating a screen of a monitor according to the fifth embodiment of the present invention.

FIG. 24 illustrates a screen of the monitor 101. The monitor 101 displays a scheduled recording start time T50 and the scheduled recording stop time T51 using letters. The monitor 101 displays a recording start time T52 and a recording stop time T53 of the camera 21 using letters. The monitor 101 displays a recording start time T54 and a recording stop time T55 of the camera 22 using characters. The monitor 101 displays a recording start time T56 and a recording stop time T57 of the camera 23 using letters. The recording start time T56 and recording stop time T57 of the camera 23 having the shortest second recording period of time are displayed to be emphasized.

The monitor 101 displays a frame image F50 and a frame image F51. The frame image F50 is a frame image corresponding to the recording start time among the frame images recorded in the camera 23. The frame image F51 is a frame image corresponding to the recording stop time among the frame images recorded by the camera 23.

Figure 25:
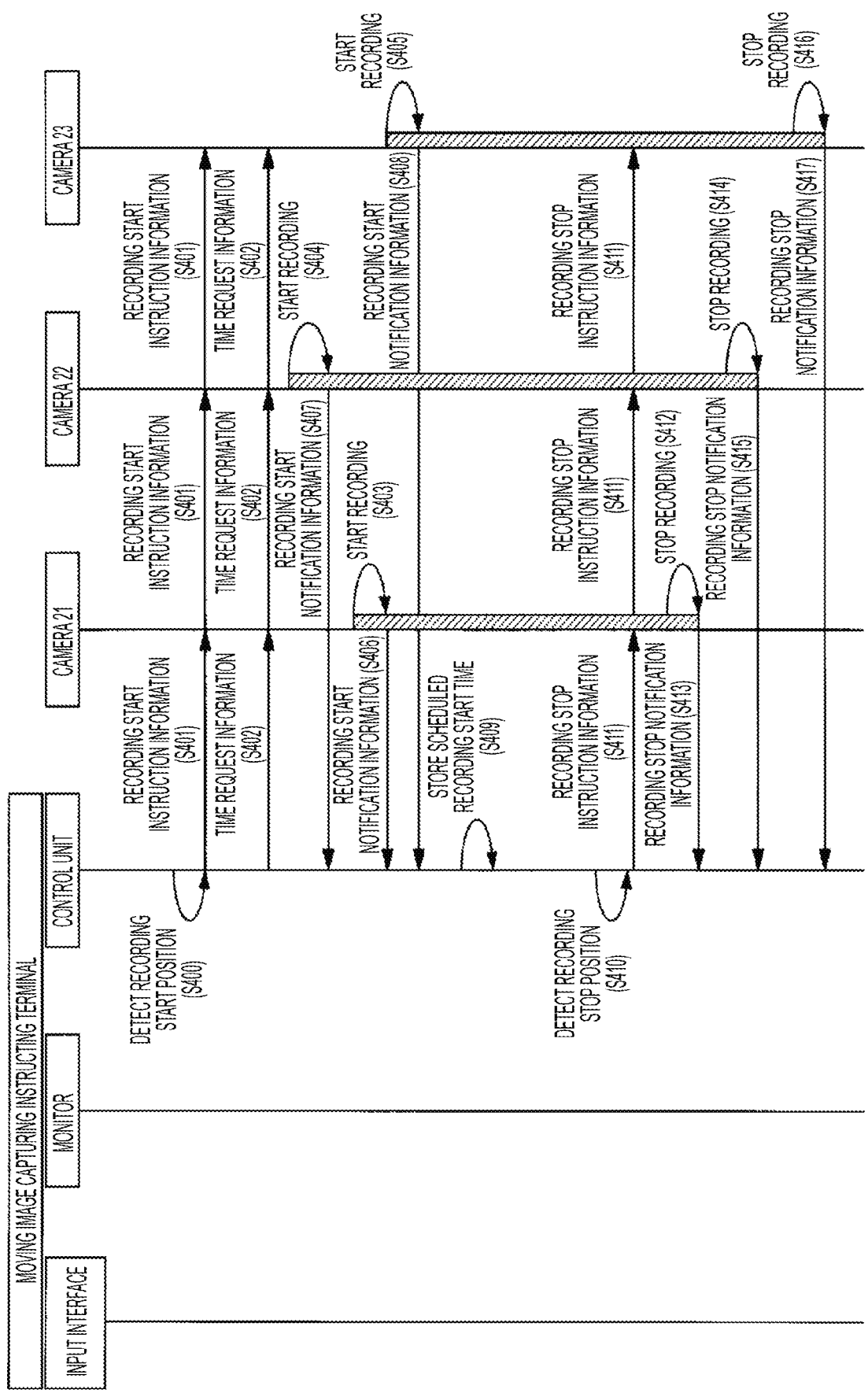
FIG. 25 is a sequence diagram illustrating a procedure of operations of a moving image capturing instructing terminal and a camera according to the fifth embodiment of the present invention.
Figure 26:
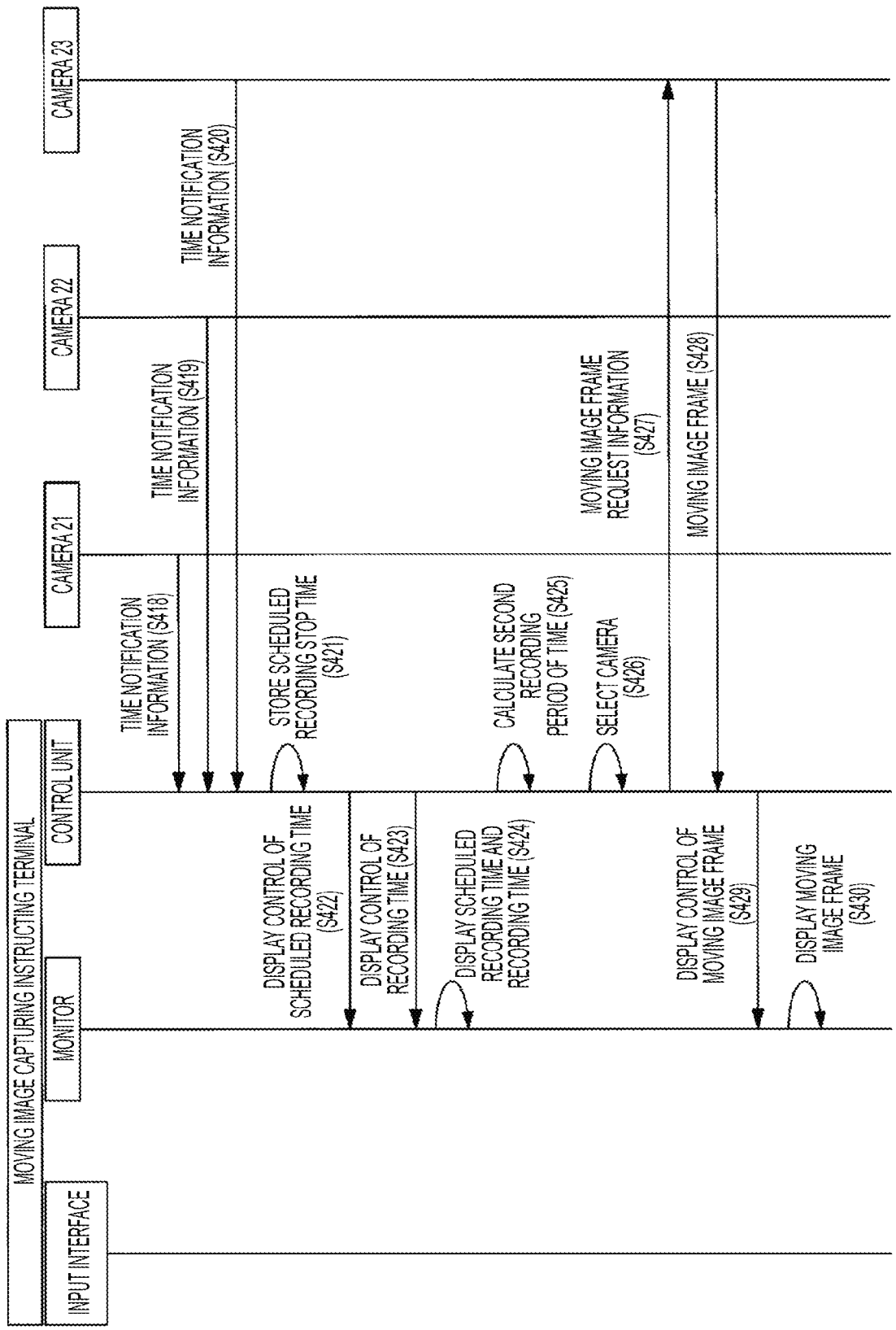
FIG. 26 is a sequence diagram illustrating a procedure of operations of the moving image capturing instructing terminal and the camera according to the fifth embodiment of the present invention.

FIGS. 25 and 26 show a procedure of operations of the moving image capturing instructing terminal 10*b* and each camera. Operations of the moving image capturing instructing terminal 10*b* and each camera will be described with reference to FIGS. 25 and 26. After the operation illustrated in FIG. 25 is performed, the operation illustrated in FIG. 26 is performed.

In the moving image capturing instructing terminal 10*b*, the control unit 103*b* detects that the moving image capturing instructing terminal 10*b* reaches the recording start position (step S400). In step S400, the control unit 103*b* stores the scheduled recording start time. The scheduled recording start time is a time generated by the clock 1030 when the moving image capturing instructing terminal 10*b* is detected to reach the recording start position.

After step S400, the control unit 103*b* generates the recording start instruction information. The control unit 103*b* transmits the recording start instruction information to the camera 21, the camera 22, and the camera 23 through the communicator 100. For example, the recording start instruction information is transmitted to each camera in a broadcast or multicast manner. In each camera, the control unit 203*b* receives the recording start instruction information from the moving image capturing instructing terminal 10*b* through the communicator 200 (step S401).

After step S401, the control unit 103*b* generates time request information. The time request information indicates an acquisition request for the recording start time and the recording stop time to each camera. The control unit 103*b* transmits the time request information to the camera 21, the camera 22, and the camera 23 through the communicator 100. For example, the time request information is transmitted to each camera in a broadcast or multicast manner. In each camera, the control unit 203*b* receives the time request information from the moving image capturing instructing terminal 10*b* through the communicator 200 (step S402).

In the camera 21, the control unit 203*b* starts the capturing and the recording of the moving image on the basis of the recording start instruction information. In other words, the control unit 203*b* starts the capturing of the moving image by the imaging element 201 and starts the recording of the moving image captured by the imaging element 201 in the memory 202 (step S403). In step S403, the control unit 203*b* stores the recording start time in the memory 202. The recording start time is a time generated by the clock 2030 when the control unit 203*b* starts the recording of the moving image. In other words, the recording start time is a time at which the recording of the moving image is started. The recording start time may be a time at which the recording start instruction information is received or a time at which the recording start notification information is transmitted. Similarly, the camera 22 starts the capturing and the recording of the moving image (step S404). Similarly, the camera 23 starts the capturing and the recording of the moving image (step S405).

After step S403, in the camera 21, the control unit 203*b* generates the recording start notification information. The control unit 203*b* transmits the recording start notification information to the moving image capturing instructing terminal 10b through the communicator 200. In the moving image capturing instructing terminal 10b, the control unit 103b receives the recording start notification information from the camera 21 through the communicator 100 (step S406). Similarly, the camera 22 transmits the recording start notification information to the moving image capturing instructing terminal 10b, and the moving image capturing instructing terminal 10b receives the recording start notification information from the camera 22 (step S407). Similarly, the camera 23 transmits the recording start notification information to the moving image capturing instructing terminal 10b, and the moving image capturing instructing terminal 10b receives the recording start notification information from the camera 23 (step S408).

After the recording start notification information is received from all the cameras, the control unit 103b in the moving image capturing instructing terminal 10b stores the scheduled recording start time in the memory 102 (step S409). The scheduled recording start time may be a time at which the recording start instruction information is transmitted.

After step S409, the control unit 103b detects that the moving image capturing instructing terminal 10b reaches the recording stop position (step S410). In step S410, the control unit 103b stores the scheduled recording stop time. The scheduled recording stop time is a time generated by the clock 1030 when the moving image capturing instructing terminal 10b is detected to reach the recording stop position.

After step S410, the control unit 103b generates the recording stop instruction information. The control unit 103b transmits the recording stop instruction information to the camera 21, the camera 22, and the camera 23 through the communicator 100. For example, the recording stop instruction information is transmitted to each camera in a broadcast or multicast manner. In each camera, the control unit 203b receives the recording stop instruction information from the moving image capturing instructing terminal 10b through the communicator 200 (step S411).

In the camera 21, the control unit 203b stops the capturing and the recording of the moving image on the basis of the recording stop instruction information received in step S411. In other words, the control unit 203b stops the capturing of the moving image by the imaging element 201 and stops the recording of the moving image captured by the imaging element 201 in the memory 202 (step S412). In step S412, the control unit 203b stores the recording stop time in the memory 202. The recording stop time is a time generated by the clock 2030 when the control unit 203b stops the recording of the moving image. In other words, the recording stop time is a time at which the recording of the moving image is stopped.

After step S412, in the camera 21, the control unit 203b generates the recording stop notification information. The control unit 203b transmits the recording stop notification information to the moving image capturing instructing terminal 10b through the communicator 200. In the moving image capturing instructing terminal 10b, the control unit 103b receives the recording stop notification information from the camera 21 through the communicator 100 (step S413).

Similarly, the camera 22 stops the capturing and the recording of the moving image (step S414). Similarly, the camera 22 transmits the recording stop notification information to the moving image capturing instructing terminal 10b, and the moving image capturing instructing terminal 10b receives the recording stop notification information from the camera 22 (step S415). Similarly, the camera 23 stops the capturing and the recording of the moving image (step S416). Similarly, the camera 23 transmits the recording stop notification information to the moving image capturing instructing terminal 10b, and the moving image capturing instructing terminal 10b receives the recording stop notification information from the camera 23 (step S417).

After step S417, in the camera 21, the control unit 203b reads the recording start time and the recording stop time from the memory 202 on the basis of the time request information received in step S402. The control unit 203b generates the time notification information. The time notification information includes the recording start time and the recording stop time read from the memory 202. The time notification information corresponds to the moving image recording information. The control unit 203b transmits the time notification information to the moving image capturing instructing terminal 10b through the communicator 200. In the moving image capturing instructing terminal 10b, the control unit 103b receives time notification information from the camera 21 through the communicator 100 (step S418). In step S418, the control unit 103b stores the recording start time and the recording stop time included in the received time notification information in the memory 102. Similarly, the camera 22 transmits the time notification information to the moving image capturing instructing terminal 10b, and the moving image capturing instructing terminal 10b receives the time notification information from the camera 22 (step S419). Similarly, the camera 23 transmits the time notification information to the moving image capturing instructing terminal 10b, and the moving image capturing instructing terminal 10b receives the time notification information from the camera 23 (step S420).

After the recording period of time notification information is received from all the cameras, the control unit 103b stores the scheduled recording stop time in the memory 102 (step S421). The scheduled recording stop time may be a time at which the recording stop instruction information is transmitted.

After step S421, the control unit 103b performs display control such that the scheduled recording start time and the scheduled recording stop time are displayed on the monitor 101 (step S422). In step S422, the control unit 103b reads the scheduled recording start time and the scheduled recording stop time from the memory 102 and performs display control on the basis of the read scheduled recording start time and the scheduled recording stop time.

After step S422, the control unit 103b performs display control such that the recording start time and the recording stop time are displayed on the monitor 101 (step S423). In step S423, the control unit 103b reads the recording start time and the recording stop time from the memory 102 and performs display control on the basis of the recording start time and the recording stop time which are read out. The monitor 101 displays the scheduled recording start time, the scheduled recording stop time, the recording start time, and the recording stop time (step S424).

After step S424, the control unit 103b reads the recording start time, the recording stop time, and the scheduled recording stop time from the memory 102. The control unit 103b calculates the second recording period of time on the basis of Formula (1) described in the third embodiment (step S425). In step S425, the control unit 103b stores the calculated second recording period of time in the memory 102. Before the process of step S422 is performed, the process of step S425 may be performed.

After step S425, the control unit 103b selects the camera having the shortest second recording period of time calculated in step S425 (step S426). In the case of the above example, in step S426, the control unit 103b selects the camera 23. After step S426, the control unit 103b generates moving image frame request information. The moving image frame request information indicates an acquisition request for the moving image frame to the camera. The moving image frame request information corresponds to the image transmission instruction information. The control unit 103b transmits the moving image frame request information to the camera 23 through the communicator 100. In the camera 23, the control unit 203b receives the moving image frame request information from the moving image capturing instructing terminal 10b through the communicator 200 (step S427).

The control unit 203b reads one or more moving image frames from the memory 202 on the basis of the moving image frame request information. In the above example, the control unit 203b reads out two frame images corresponding to the recording start time and the recording stop time from the memory 202. The control unit 203b transmits the two frame images read from the memory 202 to the moving image capturing instructing terminal 10b through the communicator 200. In the moving image capturing instructing terminal 10b, the control unit 103b receives two frame images from the camera 23 through the communicator 100 (step S428).

After step S428, the control unit 103b performs display control such that the two moving image frames received in step S428 are displayed on the monitor 101 (step S429). The monitor 101 displays the two moving image frames (step S430).

Figure 27:
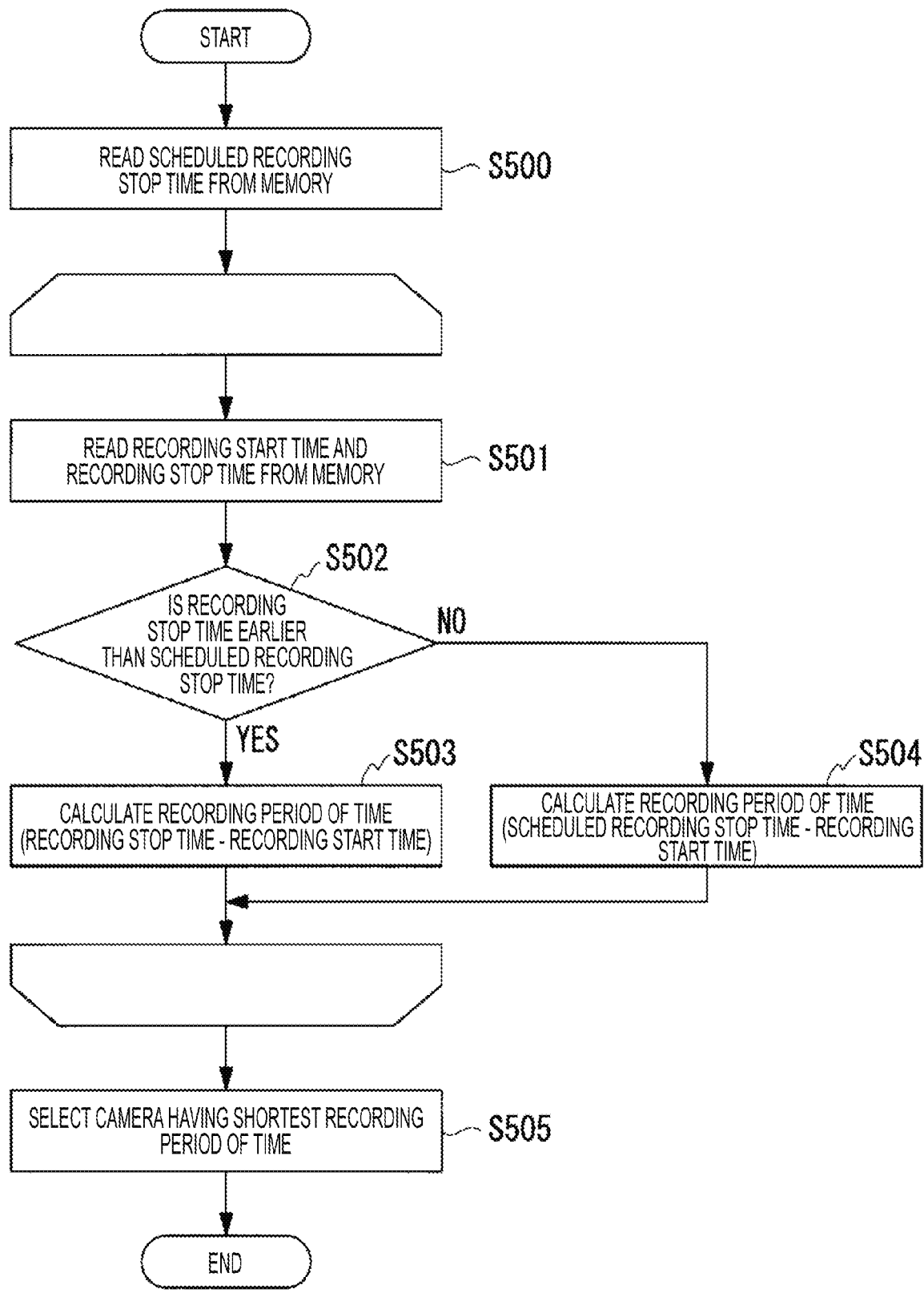
FIG. 27 is a flowchart illustrating a procedure of operations of the moving image capturing instructing terminal according to a fifth embodiment of the present invention.

The process of step S425 and step S426 may be performed in accordance with a procedure illustrated in FIG. 27. FIG. 27 illustrates a procedure of selecting a camera having the shortest recording period of time.

The control unit 103b reads the scheduled recording stop time from the memory 102 (step S500). After step S500, the process of step S501 to step S504 is performed for all of a plurality of cameras.

The control unit 103b reads the recording start time and the recording stop time of the camera of the processing target from the memory 102 (step S501). After step S501, the control unit 103b determines whether or not the recording stop time is earlier than the scheduled recording stop time (step S502). In step S502, in a case in which the recording stop time is determined to be earlier than the scheduled recording stop time, the control unit 103b calculates the recording period of time, that is, the first recording period of time by subtracting the recording start time from the recording stop time (step S503). In step S502, in a case in which it is determined that the recording stop time is the same as the scheduled recording stop time or is later than the scheduled recording stop time, the control unit 103b calculates the recording period of time, that is, the second recording period of time by subtracting the recording start time from the scheduled recording stop time (step S504). After the process of step S501 to step S504 is performed for all of a plurality of cameras, the control unit 103b selects the camera having the shortest recording period of time among a plurality of cameras (step S505).

In the example above, all the cameras stop the recording of the moving image after the recording stop instruction information is received. In other words, all the cameras stop the recording of the moving image after the scheduled recording stop time. Therefore, the control unit 103b may select the camera on the basis of only the delay related to the start of the recording of the moving image. In addition to in a case in which the camera receives the recording stop instruction information, in the case in which it is unlikely that the recording of the moving image is stopped, the following selection method is effective.

The camera communicating with the moving image capturing instructing terminal 10b is each of a plurality of cameras (the cameras 21, 22, and 23). After the moving image recording information is received from a plurality of cameras, the control unit 103b calculates the difference between the recording start time and the recording start instruction time for each of a plurality of cameras. The control unit 103b transmits the image transmission instruction information to the camera having the largest difference among a plurality of cameras through the communicator 100. The image transmission instruction information indicates an instruction to transmit at least one of a plurality of frame images constituting a moving image. The control unit 103b receives one or more frame images from the camera which has received the image transmission instruction information through the communicator 100. The control unit 103b displays the received frame image through the monitor 101.

In the first modified example and the second modified example of the fourth embodiment, the control unit 103b may select the camera on the basis of the difference. In the first modified example of the fourth embodiment, after the moving image recording information is received from a plurality of cameras, the control unit 103b may calculate the difference between the recording start time and the recording start instruction time for each of a plurality of cameras. The control unit 103b may display the camera information of only the camera having the largest difference among a plurality of cameras through the monitor 101. The camera information includes at least one of the recording period of time and the combination of the recording start time and the recording stop time.

In the second modified example of the fourth embodiment, after the moving image recording information is received from a plurality of cameras, the control unit 103b may calculate the difference between the recording start time and the recording start instruction time for each of a plurality of cameras. The control unit 103b may display first information to be emphasized more than second information through the monitor 101. The first information is camera information of the camera having the largest difference among a plurality of cameras. The second information is camera information of the camera excluding the camera having the largest difference among a plurality of cameras. The camera information includes at least one of the recording period of time and the combination of the recording start time and the recording stop time.

The moving image capturing instruction method according to the fifth embodiment includes steps S401 (first step), steps S418, S419, and S420 (second step), steps S422 and S424 (third step), and steps S423 and S424 (fourth step). The moving image capturing instruction method of each aspect of the present invention may not have steps other than step corresponding to the first to fourth steps.

In the fifth embodiment, the scheduled recording start time, the scheduled recording stop time, the recording start time, and the recording stop time are displayed. Therefore, the moving image capturing instructing terminal 10b can notify the user of the information for checking the time at which the moving image is recorded. The user can confirm whether or not the moving image of the time intended by the user is recorded by the camera 21, the camera 22, and the camera 23 on the basis of the information displayed on the monitor 101. For example, in a case in which the scheduled recording start time and the recording start time are significantly different or in a case in which the scheduled recording stop time and the recording stop time are significantly different, the user can understand that there is a high possibility that the moving image of the time intended by the user is not captured by the camera.

In the fifth embodiment, the frame image captured by the camera having the shortest recording period of time among a plurality of cameras is displayed. Therefore, the user can understand the period in which a plurality of cameras perform the capturing and the recording of the moving image simultaneously in association with a photographing scene. Since the moving image capturing instructing terminal 10b acquires the frame image from the camera, the communication amount is reduced as compared with a case in which the moving image is reproduced in a streaming manner.

In the fifth embodiment, the moving image capturing instructing terminal 10b acquires the frame image from the camera having the largest difference between the recording start time and the scheduled recording start time. A process of evaluating this difference can be easily implemented.

Modified Example of Fifth Embodiment

In a modified example of the fifth embodiment, the camera communicating with the moving image capturing instructing terminal 10b is each of a plurality of cameras (the cameras 21, 22, and 23). After the moving image recording information is received from a plurality of cameras, the control unit 103b calculates the recording period of time included in the period of time between the scheduled recording start time and the scheduled recording stop time on the basis of the moving image recording information for each of a plurality of cameras. The control unit 103b transmits the moving image reproduction instruction information to the camera having the longest recording period of time among a plurality of cameras through the communicator 100. The moving image reproduction instruction information indicates moving image streaming reproduction instruction. The control unit 103b continuously receives each of a plurality of frame images constituting the moving image from the camera which has received the moving image reproduction instruction information through the communicator 100. The control unit 103b continuously displays the received frame image through the monitor 101. The control unit 103b displays an event related to the capturing and the recording of the moving image in synchronization with the display of the frame image through the monitor 101.

In one of a plurality of cameras, the control unit 203b receives the moving image reproduction instruction information from the moving image capturing instructing terminal 10b through the communicator 200. The control unit 203b continuously reads each of a plurality of frame images constituting one moving image from the memory 202 on the basis of the moving image reproduction instruction information. The control unit 203b continuously transmits the read frame images to the moving image capturing instructing terminal 10b through the communicator 200.

Figure 28:
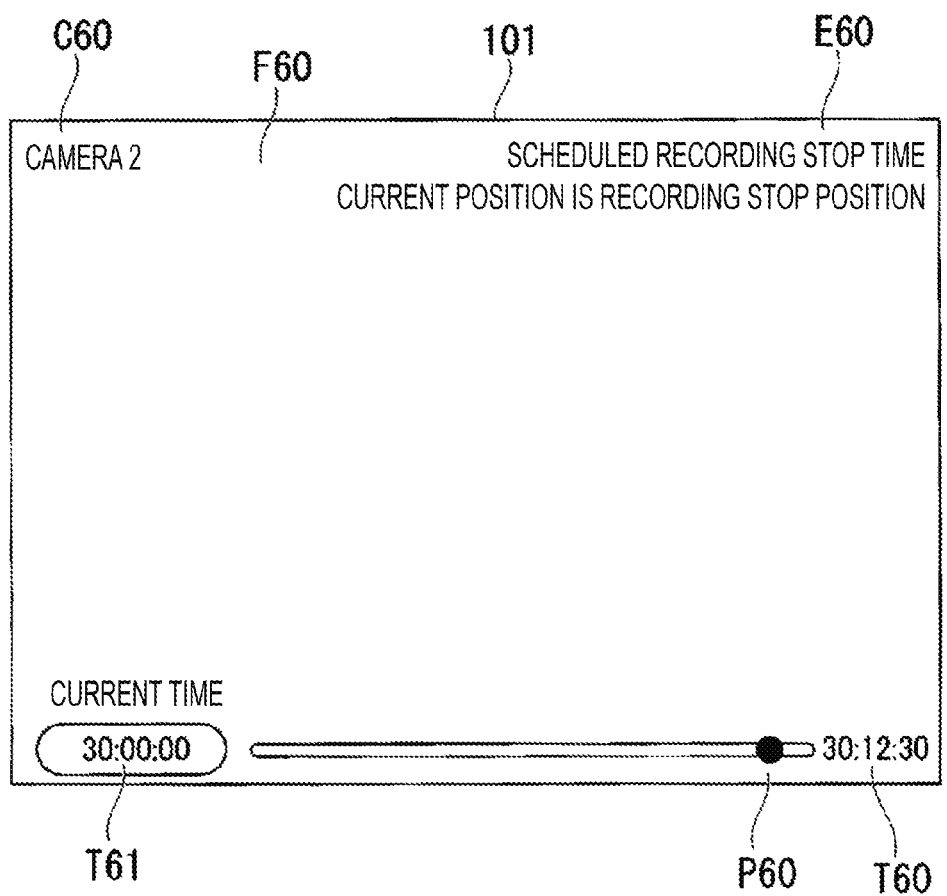
FIG. 28 is a reference diagram illustrating a screen of a monitor according to a modified example of the fifth embodiment of the present invention.

FIG. 28 illustrates a screen of the monitor 101 at the time of streaming reproduction. The monitor 101 displays a frame image F60 of the moving image captured by the camera having the longest recording period of time. The monitor 101 displays a recording period of time T60 of the moving image being reproduced and a time T61 of the moving image being reproduced. The monitor 101 displays a reproduction position P60 of the moving image being reproduced. The monitor 101 displays information C60 indicating the camera that has capturing the moving image being reproduced.

The monitor 101 displays an event E60 using letters in synchronization with the display of the frame image F60. The event E60 is superimposed on the frame image F60. In FIG. 28, the event E60 indicates that the moving image capturing instructing terminal 10b reaches the recording stop position, and a time at the time of photographing becomes the scheduled recording stop time. The event displayed on the monitor 101 may be any other event. For example, the monitor 101 may display an event indicating that a time of the camera having the longest recording period of time becomes the recording stop time. The monitor 101 may display an event indicating that a time of the camera excluding the camera having the longest recording period of time becomes the recording start time or the recording stop time. The monitor 101 may display an event occurring in the moving image capturing instructing terminal 10b. For example, an event occurring in the moving image capturing instructing terminal 10b indicates that the input interface 104 receives the recording start instruction or the recording stop instruction from the user. The monitor 101 may display an event indicating photographing control performed on the camera while the moving image is being captured. For example, the photographing control includes at least one of focus control, angle of view control, and brightness control. The photographing control may be control other than the above mentioned controls. The monitor 101 may display the event in a form other than letters. For example, the monitor 101 may display a mark indicating the event.

The streaming reproduction of the moving image recorded by the camera having the shortest recording period of time among a plurality of cameras may be performed. In other words, the control unit 103b may transmit the moving image reproduction instruction information to the camera having the shortest recording period of time among a plurality of cameras through the communicator 100. In a case in which the streaming reproduction of the moving image recorded by a camera having the shortest recording period of time among a plurality of cameras is performed, the event related to the capturing and the recording of the moving image may not be displayed.

In the modified example of the fifth embodiment, the streaming reproduction of the moving image of the camera having the longest recording period of time among a plurality of cameras is performed, and the event related to the capturing and the recording of the moving image is displayed in synchronization with the display of the frame image. The user can check a subject photographed by the camera having the longest recording period of time at the time at which the photographing is not performed by the camera excluding the camera having the longest recording period of time. Since the event is displayed in synchronization with the display of the frame image, the user can intuitively understand the event occurring in the capturing and the recording of the moving image in association with the photographing scene.

In the modified example of the fifth embodiment, the streaming reproduction of the moving image of the camera having the shortest recording period of time among a plurality of cameras is performed. Therefore, the user can understand the period in which a plurality of cameras perform the capturing and the recording of the moving image simultaneously in association with the photographing scene. Since the streaming reproduction of the moving images is performed automatically, the manipulation of the user is alleviated.

The exemplary embodiments of the present invention have been described above, but the present invention is not limited to the above embodiments and the modified examples thereof. The components can be added, omitted, substituted, or changed without departing from the gist of the present invention. Further, the present invention is not limited by the above description but limited only by claims set forth below.

INDUSTRIAL APPLICABILITY

According to the embodiments of the present invention, the moving image capturing instructing terminal, the moving image capturing system, the moving image capturing instruction method, and the program can notify the user of the information for checking the timing or the time at which the moving image.

REFERENCE SIGNS LIST 1a, 1b, 1c Moving image capturing system
10a, 10b Moving image capturing instructing terminal
20a, 20b, 21, 22, 23 Camera
30 Autonomous airplane
31 Frame
32 Propeller
100, 200 Communicator
101 Monitor
102, 202 Memory
103a, 103b, 203a, 203b Control unit
104 Input interface
201 Imaging element
1030, 2030 Clock

What is claimed is:

1. A moving image capturing instructing terminal, comprising:
   a communicator that performs wireless communication with a camera that captures and records a moving image;
   a monitor;
   a memory that stores a scheduled recording start time and a scheduled recording stop time; and
   a control unit,
   wherein the control unit transmits recording start instruction information to the camera through the communicator, and the recording start instruction information indicates an instruction to start the capturing and the recording of the moving image,
   after the recording start instruction information is transmitted, the control unit receives moving image recording information related to the recording of the moving image from the camera through the communicator,
   after the recording start instruction information is transmitted, the control unit displays at least one of a scheduled recording period of time and a combination of a scheduled recording start time and a scheduled recording stop time through the monitor, and the scheduled recording period of time is based on the scheduled recording start time and the scheduled recording stop time, and
   after the moving image recording information is received, the control unit displays at least one of a recording period of time and a combination of a recording start time and a recording stop time through the monitor, and the recording period of time, the recording start time, and the recording stop time are based on the moving image recording information.

2. The moving image capturing instructing terminal according to claim 1, further comprising
   an input interface that receives an instruction from a user,
   wherein, when the input interface receives a recording start instruction from the user, the control unit transmits the recording start instruction information to the camera through the communicator, and the memory stores the scheduled recording start time.

3. The moving image capturing instructing terminal according to claim 2,
   wherein, after the recording start instruction information is transmitted, when the input interface receives a recording stop instruction from the user, the control unit transmits the recording stop instruction information to the camera by the communicator, the memory stores the scheduled recording stop time, and the recording stop instruction information indicates an instruction to stop the capturing and the recording of the moving image.

4. The moving image capturing instructing terminal according to claim 2,
   wherein the memory further stores the scheduled recording period of time, and
   when the scheduled recording period of time elapses from after the input interface receives the recording start instruction from the user, the control unit transmits recording stop instruction information to the camera through the communicator, the memory stores the scheduled recording stop time, and the recording stop instruction information indicates an instruction to stop the capturing and the recording of the moving image.

5. The moving image capturing instructing terminal according to claim 1,
   wherein the memory further stores a program in which an operation of the control unit is specified,
   the control unit transmits the recording start instruction information to the camera through the communicator in accordance with the program,
   when the control unit transmits the recording start instruction information to the camera through the communicator, the memory stores the scheduled recording start time,
   after the recording start instruction information is transmitted, the control unit further transmits recording stop instruction information to the camera through the communicator in accordance with the program, and the recording stop instruction information indicates an instruction to the capturing and the recording of the moving image, and
   when the control unit transmits the recording stop instruction information to the camera through the communicator, the memory stores the scheduled recording stop time.

6. The moving image capturing instructing terminal according to claim 1,
   wherein the moving image recording information includes the recording period of time based on the recording start time and the recording stop time, and
   after the moving image recording information is received, the control unit displays the recording period of time by the monitor.

7. The moving image capturing instructing terminal according to claim 1, wherein the moving image recording information includes one of information including the recording start time which is received from the camera through the communicator and information which is transmitted by the camera at the recording start time and received through the communicator, and the moving image recording information includes one of information including the recording stop time which is received from the camera through the communicator and information which is transmitted from the camera at the recording stop time and received through the communicator, after the moving image recording information is received, the control unit performs one of a first process and a second process, in the first process, the control unit calculates the recording period of time on the basis of the recording start time and the recording stop time, and displays the recording period of time through the monitor, and in the second process, the control unit displays a combination of the recording start time and the recording stop time through the monitor.

8. The moving image capturing instructing terminal according to claim 1, wherein, after the moving image recording information is received, the control unit further calculates a difference between the recording stop time and the scheduled recording stop time, the control unit further calculates a second recording period of time on the basis of a difference with a first recording period of time based on the moving image recording information, and the control unit displays the second recording period of time through the monitor.

9. The moving image capturing instructing terminal according to claim 1, wherein, after the moving image recording information is received, the control unit further calculates the recording period of time on the basis of the recording start time and the scheduled recording stop time, and displays the recording period of time through the monitor.

10. The moving image capturing instructing terminal according to claim 1, wherein the camera is each of a plurality of cameras, after the moving image recording information is received from the plurality of cameras, the control unit further calculates the recording period of time included in a period of time included between the scheduled recording start time and the scheduled recording stop time on the basis of the moving image recording information for each of the plurality of cameras, and the control unit displays camera information of only the camera having a shortest recording period of time among the plurality of cameras through the monitor, and the camera information includes at least one of the recording period of time and the combination of the recording start time and the recording stop time.

11. The moving image capturing instructing terminal according to claim 1, wherein the camera is each of a plurality of cameras, after the moving image recording information is received from the plurality of cameras, the control unit further calculates the recording period of time included in a period of time included between the scheduled recording start time and the scheduled recording stop time on the basis of the moving image recording information for each of the plurality of cameras, and the control unit displays first information to be emphasized more than second information through the monitor, the first information is camera information of the camera having a shortest recording period of time among the plurality of cameras, the second information is camera information of the camera excluding the camera having the shortest recording period of time among the plurality of cameras, and the camera information includes at least one of the recording period of time and the combination of the recording start time and the recording stop time.

12. The moving image capturing instructing terminal according to claim 1, wherein the camera is each of a plurality of cameras, after the moving image recording information is received from the plurality of cameras, the control unit further calculates the recording period of time included in a period of time included between the scheduled recording start time and the scheduled recording stop time on the basis of the moving image recording information for each of the plurality of cameras, the control unit further transmits image transmission instruction information to the camera having a shortest recording period of time among the plurality of cameras through the communicator, and the image transmission instruction information indicates an instruction to transmit at least one of a plurality of frame images constituting the moving image, the control unit further receives one or more frame images from the camera which has received the image transmission instruction information through the communicator, and the control unit further displays the received frame image through the monitor.

13. The moving image capturing instructing terminal according to claim 1, wherein the camera is each of a plurality of cameras, after the moving image recording information is received from the plurality of cameras, the control unit further calculates the recording period of time included in a period of time included between the scheduled recording start time and the scheduled recording stop time on the basis of the moving image recording information for each of the plurality of cameras, the control unit further transmits moving image reproduction instruction information to the camera having a shortest recording period of time among the plurality of cameras through the communicator, and the moving image reproduction instruction information indicates a streaming reproduction instruction of the moving image, the control unit further continuously receives each of a plurality of frame images constituting the moving image from the camera which has received the moving image reproduction instruction information through the communicator, and the control unit further continuously displays the received frame images through the monitor.

14. The moving image capturing instructing terminal according to claim 1, wherein the camera is each of a plurality of cameras, after the moving image recording information is received from the plurality of cameras, the control unit further calculates the recording period of time included in a period of time included between the scheduled recording start time and the scheduled recording stop time on the basis of the moving image recording information for each of the plurality of cameras, the control unit further transmits moving image reproduction instruction information to the camera having a longest recording period of time among the plurality of cameras through the communicator, and the moving image reproduction instruction information indicates a streaming reproduction instruction of the moving image, the control unit further continuously receives each of a plurality of frame images constituting the moving image from the camera which has received the moving image reproduction instruction information through the communicator, the control unit further continuously displays the received frame images through the monitor, and the control unit further displays an event related to the capturing and the recording of the moving image in synchronization with the display of the frame images through the monitor.

15. The moving image capturing instructing terminal according to claim 1, wherein the camera is each of a plurality of cameras, after the moving image recording information is received from the plurality of cameras, the control unit further calculates a difference between the recording start time and the scheduled recording start time for each of the plurality of cameras, and the control unit displays camera information of only the camera having a largest difference among the plurality of cameras through the monitor, and the camera information includes at least one of the recording period of time and the combination of the recording start time and the recording stop time.

16. The moving image capturing instructing terminal according to claim 1, wherein the camera is each of a plurality of cameras, after the moving image recording information is received from the plurality of cameras, the control unit further calculates a difference between the recording start time and the scheduled recording start time for each of the plurality of cameras, and the control unit displays first information to be emphasized more than second information through the monitor, the first information is camera information of the camera having a largest difference among the plurality of cameras, the second information is camera information of the camera excluding the camera having the largest difference among the plurality of cameras, and the camera information includes at least one of the recording period of time and the combination of the recording start time and the recording stop time.

17. The moving image capturing instructing terminal according to claim 1, wherein the camera is each of a plurality of cameras, after the moving image recording information is received from the plurality of cameras, the control unit further calculates a difference between the recording start time and the scheduled recording start time for each of the plurality of cameras, the control unit further transmits image transmission instruction information to the camera having a largest difference among the plurality of cameras through the communicator, and the image transmission instruction information indicates an instruction to transmit at least one of a plurality of frames constituting the moving image, the control unit further receives one or more frame images from the camera which has received the image transmission instruction information through the communicator, and the control unit further displays the received frame image through the monitor.

18. The moving image capturing instructing terminal according to claim 1, wherein the control unit includes one or more processors.

19. A moving image capturing system, comprising:

a moving image capturing instructing terminal; and a camera that captures and records a moving image, wherein the moving image capturing instructing terminal comprises a first communicator that performs wireless communication with the camera, a monitor, a first memory that stores a scheduled recording start time and a scheduled recording stop time, and a first control unit, wherein the first control unit transmits recording start instruction information to the camera through the first communicator, and the recording start instruction information indicates an instruction to start the capturing and the recording of the moving image, after the recording start instruction information is transmitted, the first control unit receives moving image recording information related to the recording of the moving image from the camera through the first communicator, after the recording start instruction information is transmitted, the first control unit displays at least one of a scheduled recording period of time and a combination of the scheduled recording start time and the scheduled recording stop time through the monitor, and the scheduled recording period of time is based on the scheduled recording start time and the scheduled recording stop time, and after the moving image recording information is received, the first control unit displays at least one of a recording period of time and a combination of a recording start time and a recording stop time through the monitor, and the recording period of time, the recording start time, and the recording stop time are based on the moving image recording information, and the camera includes:

a second communicator that performs wireless communication with the moving image capturing instructing terminal, an imaging element, a second memory, and a second control unit, the second control unit receives the recording start instruction information from the moving image capturing instructing terminal through the second communicator, after the recording start instruction information is received, the second control unit starts the capturing of the moving image by the imaging element, after the capturing of the moving image is started, the second control unit stops the capturing of the moving image by the imaging element, before the capturing of the moving image is stopped after the capturing of the moving image is started, the second control unit records the moving image in the second memory, and after the capturing of the moving image is stopped, the second control unit transmits the moving image recording information to the moving image capturing instructing terminal by the second communicator.

20. A moving image capturing instruction method, comprising:

a first step of transmitting recording start instruction information to a camera by a communicator performing wireless communication with the camera, the recording start instruction information indicating an instruction to start capturing and recording of a moving image, and the camera performing the capturing and the recording of the moving image;

a second step of receiving, after the recording start instruction information is transmitted, moving image recording information related to the recording of the moving image from the camera through the communicator;

a third step of displaying, after the recording start instruction information is transmitted, at least one of a scheduled recording period of time and a combination of a scheduled recording start time and a scheduled recording stop time through a monitor, the scheduled recording period of time being based on the scheduled recording start time and the scheduled recording stop time stored in a memory; and a fourth step of displaying, after the moving image recording information is received, at least one of a recording period of time and a combination of a recording start time and a recording stop time through the monitor, the recording period of time, the recording start time, and the recording stop time being based on the moving image recording information.

21. A non-transitory computer-readable storage medium storing a program for causing a computer of a moving image capturing instructing terminal to execute a plurality of steps, wherein the moving image capturing instructing terminal comprises: the computer, a communicator that performs wireless communication with a camera that captures and records a moving image, a monitor, and a memory that stores a scheduled recording start time and a scheduled recording stop time, wherein the plurality of steps comprises:

a first step of transmitting recording start instruction information to the camera through the communicator, the recording start instruction information indicating an instruction to start the capturing and the recording of the moving image;

a second step of receiving, after the recording start instruction information is transmitted, moving image recording information related to the recording of the moving image from the camera through the communicator;

a third step of displaying, after the recording start instruction information is transmitted, at least one of a scheduled recording period of time and a combination of the scheduled recording start time and the scheduled recording stop time through the monitor, the scheduled recording period of time being based on the scheduled recording start time and the scheduled recording stop time stored in the memory; and a fourth step of displaying, after the moving image recording information is received, at least one of a recording period of time and a combination of a recording start time and a recording stop time through the monitor, and the recording period of time, the recording start time, and the recording stop time being based on the moving image recording information.

* * * * *